United States Patent
Suryavanshi et al.

(10) Patent No.: US 9,130,942 B2
(45) Date of Patent: Sep. 8, 2015

(54) OPTIMIZING RECIPIENT APPLICATION SELECTION IN A MULTIPLE APPLICATION ENVIRONMENT USING EQUIVALENCE CLASSES FOR APPLICATIONS

(71) Applicant: QUALCOMM Incorporated, San Diego, CA (US)

(72) Inventors: Vijay A. Suryavanshi, San Diego, CA (US); Mark Maggenti, San Diego, CA (US); Mohammed Ataur R. Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 13/759,497

(22) Filed: Feb. 5, 2013

(65) Prior Publication Data
US 2014/0222952 A1 Aug. 7, 2014

(51) Int. Cl.
*G06F 15/16* (2006.01)
*H04L 29/08* (2006.01)
*H04W 4/20* (2009.01)
*H04W 4/00* (2009.01)

(52) U.S. Cl.
CPC ............. *H04L 67/10* (2013.01); *H04W 4/20* (2013.01); *H04W 4/001* (2013.01)

(58) Field of Classification Search
CPC ........ H04L 67/10; H04W 4/20; H04W 4/001; H04W 8/02; H04W 8/06
See application file for complete search history.

(56) References Cited

U.S. PATENT DOCUMENTS

| | | | |
|---|---|---|---|
| 7,499,973 B2 | 3/2009 | Couts et al. | |
| 8,832,840 B2 * | 9/2014 | Zhu et al. | 726/25 |
| 2004/0085947 A1 | 5/2004 | Ekberg et al. | |
| 2004/0186918 A1 * | 9/2004 | Lonnfors et al. | 709/250 |
| 2006/0236370 A1 * | 10/2006 | John et al. | 726/1 |
| 2008/0133923 A1 * | 6/2008 | Sakamura et al. | 713/176 |
| 2008/0172486 A1 * | 7/2008 | Danne et al. | 709/224 |
| 2009/0069915 A1 | 3/2009 | Khedouri et al. | |

(Continued)

FOREIGN PATENT DOCUMENTS

| | | |
|---|---|---|
| EP | 1971110 A1 | 9/2008 |
| WO | 2006125471 A1 | 11/2006 |
| WO | 2012059961 A1 | 10/2012 |

OTHER PUBLICATIONS

International Search Report and Written Opinion—PCT/US2014/012561—ISA/EPO—May 9, 2014.

*Primary Examiner* — Krisna Lim
(74) *Attorney, Agent, or Firm* — The Marbury Law Group, PLLC

(57) ABSTRACT

The various embodiments provide a framework for using a server to create and maintain equivalence classes among applications operating on multiple devices that have registered with the server. In the various embodiments, the server may use equivalence classes to select an application on a target device (the "recipient application") that has the highest probability of being able to receive shared media from an application operating on the originator device (i.e., the "originator application") based on the recipient application's similarity to the originator application. The various embodiments further enhance privacy protections and the overall user experience by enabling the server to select an appropriate recipient application on the target device without the originator device or its user having to know anything about the target device's characteristics and functionalities.

128 Claims, 13 Drawing Sheets

(56) References Cited

U.S. PATENT DOCUMENTS

| | | |
|---|---|---|
| 2009/0225760 A1 | 9/2009 | Foti |
| 2010/0031299 A1 | 2/2010 | Harrang et al. |
| 2011/0067093 A1* | 3/2011 | Kamada et al. .................. 726/7 |
| 2011/0270929 A1 | 11/2011 | Harrang et al. |
| 2013/0186918 A1* | 7/2013 | Menceles et al. ............. 222/567 |
| 2014/0013109 A1* | 1/2014 | Yin ............................... 713/156 |

* cited by examiner

OPTIMIZING RECIPIENT APPLICATION SELECTION IN A MULTIPLE APPLICATION ENVIRONMENT USING EQUIVALENCE CLASSES FOR APPLICATIONS

BACKGROUND

Devices like mobile phones and tablets may contain multiple applications. Users may utilize the applications on these devices to send media to other users over a network connection. These applications may function together with a high-level operating system, such as Android® or iOS®, but each application may have its own library of functions and capabilities. For example, on a mobile device, a user may have a picture-taking application and a music-playing application. While the applications may operate on the same device, each application may only be capable of using or handling certain types of data.

This difference of functionality among applications can be an obstacle when one user desires to send media from his device (i.e., the "originator device") to another user's device (i.e., the "target device") without knowing which applications are on the target device. For example, if a user wishes to send a song to a target device with his music-playing application, the application (and the user) may not know whether the target device has an application that is configured to receive and play the song because of the song file's unusual file format (e.g., file having file extension .ogg).

Currently, a user may rely on existing mechanisms to facilitate a media transfer to another user, including presence functionality and capability discovery. These mechanisms typically involve instigating a handshake between the users' devices over the air to discover the target device's applications' functionalities (e.g., file-format compatibilities). However, these current mechanisms result in suboptimal performance for various reasons. For instance, today's existing methods for transferring media are network and infrastructure heavy in terms of efficiency, deployment, and scalability; require the originator device to fetch the target device's application capability over the air; and require the originator device to maintain a presence or capability state with respect to each target device in the originator device's contact book. The existing methods may also add to latency in the media session setup phase unless retrieval of recipient application capability is done offline and maintained locally in the cache.

SUMMARY

Because current media-sharing practices are suboptimal for the reasons discussed above, there is a need to deduce the "right" or equivalent application on a target device that can handle the media for a given media session with an originator device while reducing the use of resources, processing time, and bandwidth to discover the capabilities and functionalities of that target device.

The various embodiments provide a framework for using a server to create and maintain equivalence classes among applications operating on multiple devices that have registered with the server. In the various embodiments, the server may use equivalence classes to select an application on a target device (the "recipient application") that has the highest probability of being able to receive shared media from an application operating on the originator device (i.e., the "originator application") based on the recipient application's similarity to the originator application. By enabling a server to have accurate information about the applications operating on registered devices, including information about the applications' media-specific capabilities, the various embodiments promote the user's experience by reducing latency and processing when the user desires to transfer media to another user or users. The various embodiments further enhance privacy protections and the overall user experience by enabling the server to select an appropriate recipient application on the target device without the originator device or its user having to know anything about the target device's characteristics and functionalities.

In the various embodiments, computing devices (e.g., smartphones) may have installed multiple applications, and each application may be classified by various criteria (e.g., the ability to decode or encode a particular media type). Also, in the various embodiments, applications operating on each computing device may communicate with the same backend application server for registration and media transaction purposes.

In the various embodiments, users may register their applications and devices with a server, providing information that enables the server to associate users with their devices, devices with their installed applications, and applications with their functionalities or other properties. In an embodiment, a server may also maintain relationship information in the form of equivalence classes among the applications installed on a user device. These application equivalence classes may allow a server to select an application that has the highest probability of being compatible with media shared by an originator application.

In the various embodiments, an application may belong to an equivalence class if the application has one or more characteristics that define the equivalence class. In an embodiment, a server may route shared media from one user to another by selecting a recipient application on the target device that has the most equivalence classes in common with the originator application. The selected recipient application may therefore have a highest probability of being able to receive the media and decode it correctly based on the number of characteristics it shares with the originator application. In another embodiment, the server may route shared media from one originator device to multiple target devices, selecting a recipient application on each respective device that has the highest number of equivalence classes in common with the originator application (i.e., shares membership in the most equivalence classes).

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
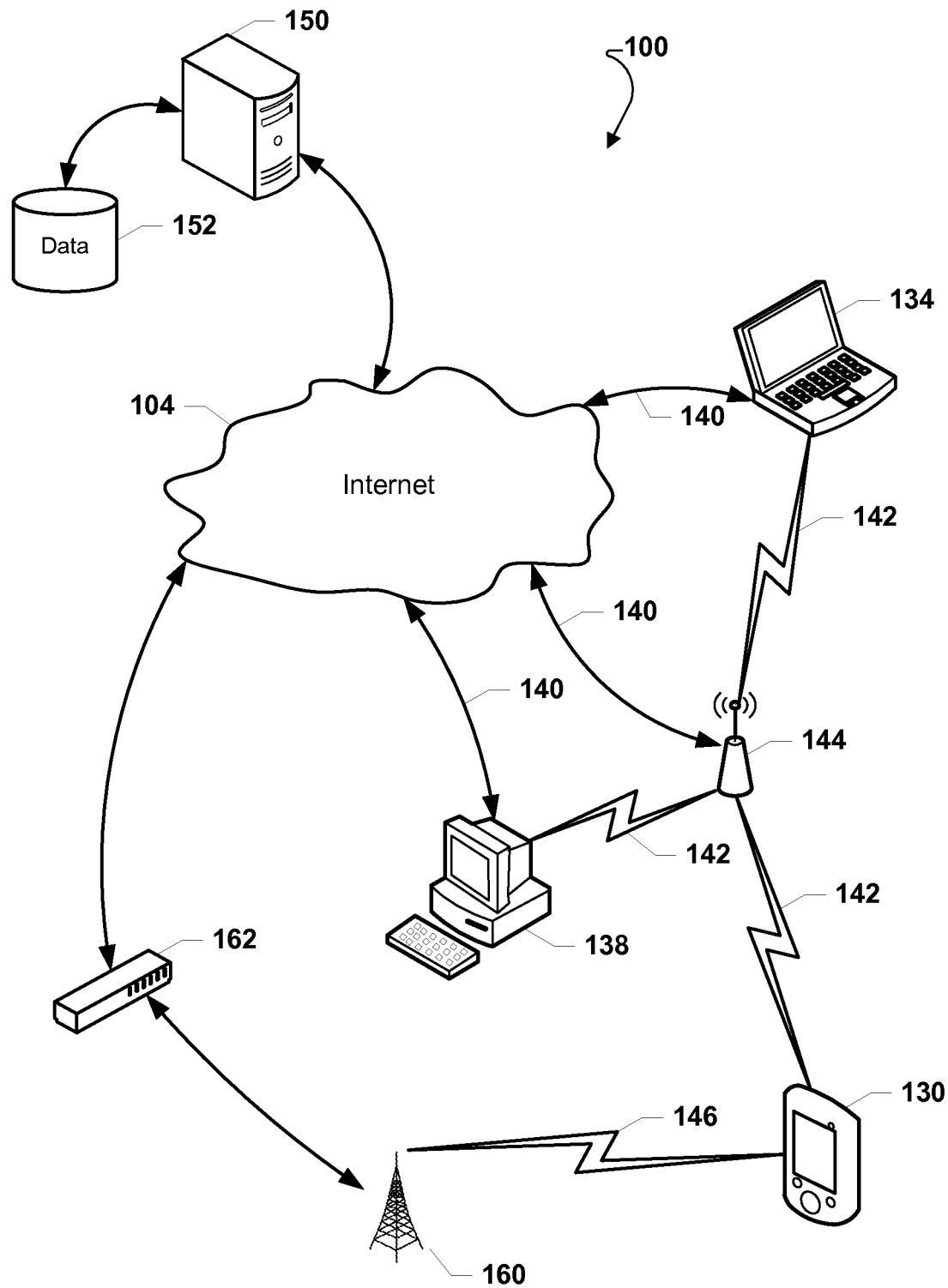
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "device," "mobile device," and "computing device" are used interchangeably herein to refer to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices that include a programmable processor and memory and circuitry for sending and/or receiving voice and data calls, sending and/or receiving messages (e.g., short message service (SMS) messages, emails, application notifications, such as Facebook® post notifications and/or game high score change notifications, etc.).

As used herein, the term "shared media" may refer to various forms of information that is electronically stored or transmitted in a variety of ways and is sent from one device to another device. Shared media may include any number of files, including documents, videos, audio, pictures, messages, emails, posts, or any other file or information stored or transmitted electronically. For example, audio stored in an MPEG-3 format or video stored as an .avi file may be shared media.

As used herein, the term "registering application" refers to an application that has not previously registered with a server and is presently attempting to register with a server. The term "registering device" refers to a device presently attempting to register one or more registering applications with a server.

As used herein, the term "originator application" refers to an application that has previously registered with a server and is presently attempting to send shared media to another device. The term "recipient application" refers to an application that a server has selected to receive shared media based on the number of shared equivalence classes that application has in common with an originator application. The term "target device" refers to a device that is the intended recipient of shared media from an originator application.

In overview, the various embodiments may enable a server to deliver shared media from an originator application to a recipient application operating on a target device without the originator application having to determine the characteristics and functionalities of the applications operating on the target device. The various embodiments may also enable a server to select a recipient application on a target device that has the highest probability of being able to receive shared media from the originator application. Thus, the various embodiments may cause users to share media faster while maintaining privacy between the originator application and the target device, which may increases overall user experience.

In the various embodiments, a user may use a device that contains multiple applications. The user may register one or more applications with a common back-end server. The contents of the registration may include, for example, the registering application's ID (i.e., an application ID), the registering application's media capabilities/functionalities, and the registering application's device ID (i.e. the ID for the device on which the registering application is operating). Using these identifiers, the server may maintain associations between an application and the device on which the application operates and between the application and its characteristics and functionalities. In another aspect, the server may also register a user's ID number associated with one or more applications or device, a port number used by the registering application to access the server, and the registering device's IP address.

In various embodiments, a server may create equivalence classes among registered applications based on some common characteristic. In an embodiment, an equivalence class may be defined based on the media encoding/decoding formats supported by the particular applications. For example, all registered applications enabled to play MP3s may belong to an equivalence class and, likewise, all registered applications enabled to display document files formatted un a "portable document format" (PDFs) may belong to another equivalence class. In other embodiments, an equivalence class may be defined based on an application's ability to support a particular media type, a user's frequency of use of a particular application, the availability or unavailability of the application on a particular carrier, and the existence of a common application developer.

In the various embodiments, an originator application may send shared media to a server for delivery to a target device. In an aspect, the originator application's request may also include information the server may use to identify the originator application (i.e., an originator application ID) and the target device to which the originator application is sending shared media (i.e., a target device ID). The server may use the target device ID to look up the applications associated with the target device ID and compare those applications' equivalence classes to the originator application's equivalence classes. In another embodiment, the server may receive a user ID, which may allow the server to identify the devices associated with that user ID. The server may then send shared media to a recipient application on each device associated with a particular user ID.

In another aspect, the server may determine whether a copy of the originator application is operating on the target device. If a copy of the originator application is operating on the target device, the server may select the copy of the originator application as the recipient application. Otherwise (i.e., the target device does not have a copy of the originator application), the server may obtain a list of the equivalence classes for each of the applications registered to the target device. In an embodiment, the server may determine how many times the originator application and each application registered to the target device are members of the same equivalence class. The server may then select a recipient application on the target device based on the application that has the most equivalence classes in common with the originator application. In another embodiment, if the target device does not have an active registration for that particular recipient application, the server may select the application with the next highest number of shared equivalence classes to be the recipient application.

In another aspect, after selecting a recipient application, the server may send a notification to the recipient application operating on the target device that shared media from the originator application is awaiting delivery, and the recipient application may acknowledge the server's notification and take delivery of the shared media. Alternatively, the server may directly send the shared media to the recipient application without sending a notification in advance. In another aspect, the server may similarly faciliate transferring shared media to recipient applications on multiple target devices.

FIG. 1 illustrates a network system 100 suitable for use with the various embodiments. The network system 100 may include a first device 130, a second device 134, and a third device 138. In an embodiment, a first device 130 may be a smart phone, a second device 134 may be a laptop computer, and a third device 138 may be a personal computer. The second device 134 and the third device 138 may be configured to connect to the Internet 104 via wired connections 140. In addition, the first device 130, second device 134, and third device 138 may be configured to connect to the Internet 104 via wireless connections 142 established through a wireless access point 144, such as a Wi-Fi® access point. The wireless access point 144 may connect with the Internet 104 through a wired connection 140. Additionally, the first device 130 and a cellular tower or base station 160 may exchange data via a cellular connection 146, which may be Code Division Multiple Access (CDMA), Time Division Multiple Access (TDMA), Global System for Mobile communications (GSM), Personal Communications Service (PCS), Third Generation (3G), Fourth Generation (4G), Long Term Evolution (LTE), or any other type of cellular connection. It should be noted that, while not shown in FIG. 1, the second device 134 and the third device 138 may be equipped with a cellular communication interface and configured to connect to the Internet 104 via a cellular connection 146, which may be CDMA, TDMA, GSM, PCS, 3G, 4G, LTE, or any other type of cellular connection. The cellular tower or base station 160 may be in communication with a router 162 which may connect to the Internet 104. A server 150 that manages registrations and delivers shared media may also connect to the Internet 104 and have access to a database 152.

Figure 2:
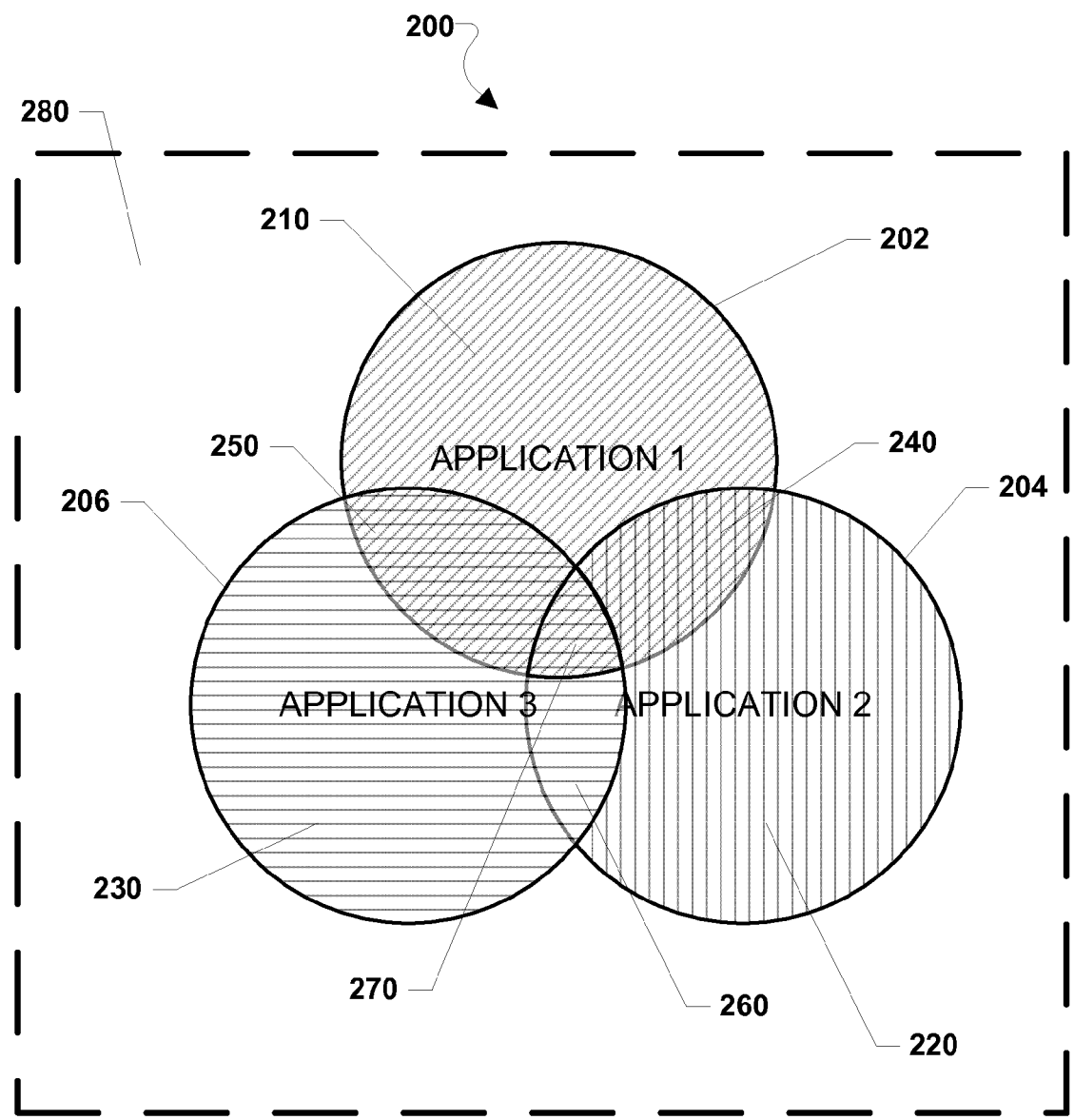
FIG. 2 is a set diagram of a multi-application system according to an embodiment.

FIG. 2 illustrates an embodiment equivalence class system 200 showing example compositions of equivalence classes. A server may have registered a first application 202 (labeled as "APPLICATION 1" in FIG. 2), a second application 204 (labeled as "APPLICATION 2" in FIG. 2), and a third application 206 (labeled as "APPLICATION 3" in FIG. 2). As part of the registration process, the server may have classified each application's characteristics and functionalities and associated each application with at least one equivalence class. For example, applications that may support a particular type of file (files having file extension e.g., .doc, .pdf, etc.) may belong to the same equivalence class, while applications that support a different type of file files having file extensions (e.g., .mp3, .mp4, .ogg) may belong to a different equivalence class. In a further embodiment, an application may belong to multiple equivalence classes depending on the application's attributes and functionalities. In another aspect, equivalence classes may extend to versions of applications, such as based on the functionality included in each version of each application. For example, many applications can read PDF files, but not all applications and versions support all of the features enabled by the latest version of Adobe PDF. Thus, all applications that can read a PDF file may be in one equivalence class, all versions of applications that can view embedded comments in a PDF file may be in another equivalence class (which would be within the PDF equivalence class), and all versions of applications that can play audio files embedded in a PDF file may be a third equivalence class. As obvious from this example, equivalence classes may overlap in terms of applications/versions, and any given application/version may be a member of multiple equivalence classes.

According to an embodiment, each of applications 202, 204, and 206 may belong to one or more equivalence classes, and the applications 202, 204, 206 may have one or more equivalence classes in common. Equivalence class subset 210 may be a set of equivalence classes (i.e., characteristics and functionality) to which the first application 202 is associated. The second application 204 and the third application 206 may not share membership to the equivalence classes in equivalence class subset 210 (i.e., the second application 204 and third application 206 do not share the characteristics and functionalities represented by these equivalence classes). For example, the first application 202 may be the only application of the three that is capable of opening a particular file type (e.g., file having file extension .ogg). Accordingly, the server may have associated the first application 202 with an equivalence class defined by an ability to open that particular file type (e.g., equivalence class subset 210). Because the second application 204 and the third application 206 are not configured to open that file type, the second application 204 and the third application 206 are not members of the equivalence class subset 210. Similarly, equivalence class subsets 220 and 230 contain the equivalence classes to which only the second application 204 and the third application 206 respectively are members out of the three applications 202, 204, and 206. For example, the second application may be the only application of the three developed by a particular company, and the third application may be the only application of the three that is capable of displaying Japanese text characters.

Equivalence class subset 240, 250, and 260 may be the equivalence classes shared by only two of the three applications. Equivalence class subset 240 may be the set of equivalence classes to which the first application 202 and the second application 204 belong. In other words, equivalence class subset 240 may represent a set of characteristics and functionalities to which both the first application 202 and the second application 204 possess. For example, the first application 202 and the second application 204 may be different versions of the same software. In this example, both applications may share core functionalities and characteristics (i.e., equivalence class subset 240), but may differ slightly depending on the version (i.e., equivalence class subset 210 and 220). To further the example, the first application 202 and the second application 204 may both be able to automatically backup a user's data (i.e., functionality within equivalence class subset 240). The first application 202, as the newer version, may be able to automatically backup data remotely, but the second application 204 may only be able to automatically backup its data locally (i.e., a functionality not in equivalence class subset 240). Similarly, the first application 202 and the third application 206 may share certain characteristics or functionalities not shared by the second application 204 and thus share membership to equivalence class subset 250 to the exclusion of the second application 204. Likewise, only the second application 204 and the third application 206 may share certain characteristics or functionalities (e.g., version, developer, functionality, file-type association, etc.) and belong to the same equivalence class subset 260. The first application 202 may not be a member of the equivalence class subset 260 because it does not share the characteristics or functionalities that define the equivalence class subset 260.

Equivalence subset 270 may represent the set of characteristics and functionalities that applications 202, 204, and 206 all share. For example, each application 202, 204, and 206 may be capable of opening the same file type, performing a spell-check function, or communicating with each other. Equivalence class subset 280 may represent characteristics and functionalities that none of applications 202, 204, and 206 possess. For example, no one of applications 202, 204, and 206 may be able to deliver voice communications through voice over IP (VoIP). In another example, none of applications 202, 204, and 206 may be capable of operating on a Linux or iOS operating system. While only three applications 202, 204, and 206 have been described in context of the above description of FIG. 2, it would be obvious to one of ordinary skill that a plurality of applications may share equivalence classes (i.e., equivalence class subsets) with one or more other applications.

Figure 3:
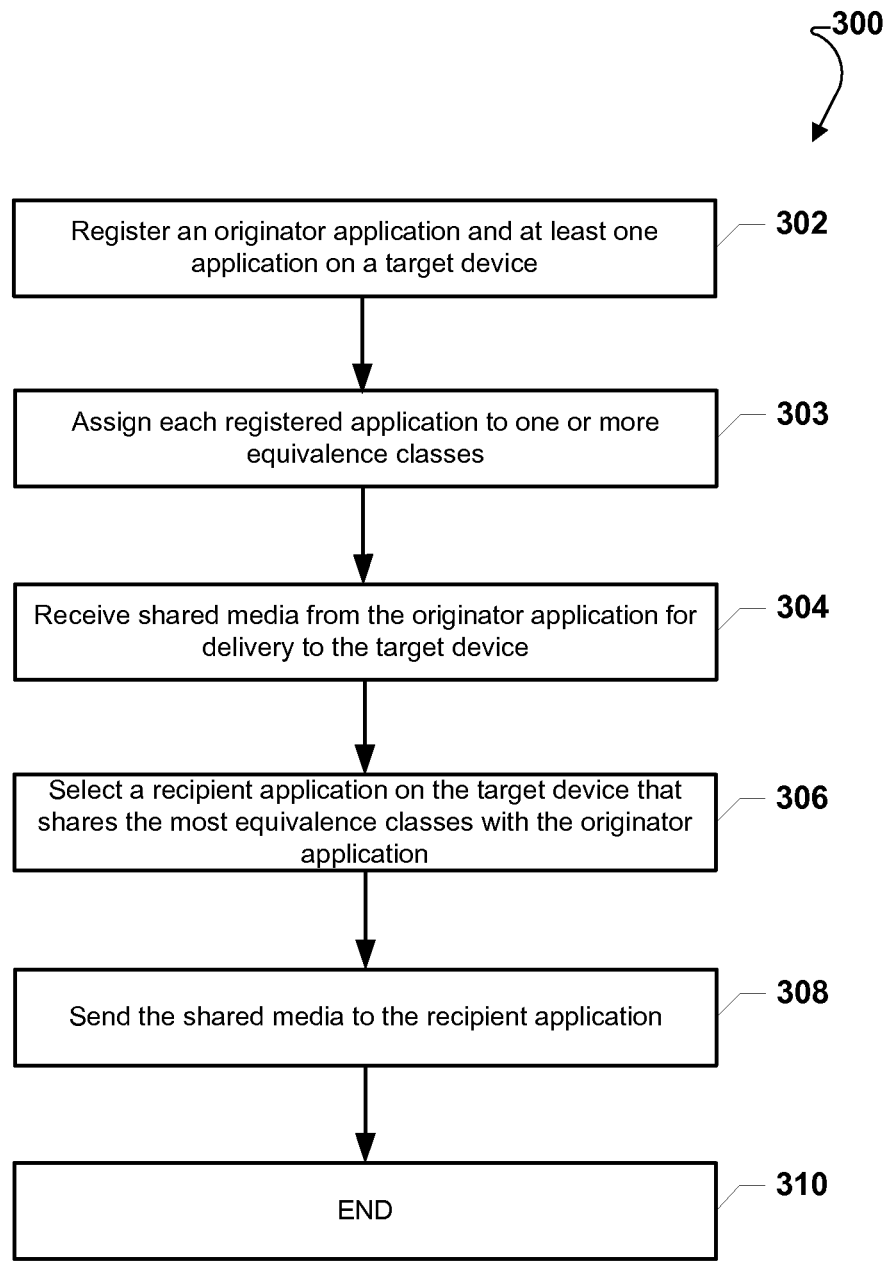
FIG. 3 is a process flow diagram illustrating an embodiment server method for transferring shared media between registered applications based on the applications' shared equivalence classes.

FIG. 3 illustrates an embodiment server method 300 for registering applications and sending shared media from an originator application to a recipient application operating on a target device based on how many equivalence classes the originator application and the recipient application have in common. In block 302, a server may register an originator application and at least one application on a target device. Registration with the server may involve associating an application with a particular device. In an embodiment, a registering application may register its application ID and its device ID with a server, and the server may store the association between that application ID and the device ID in a database for later retrieval. Specific embodiments of methods for registering one or more applications are discussed below at length in context of FIGS. 5-6.

In block 303, the server may assign each registered application to one or more equivalence classes and associate each registered application with one or more equivalence classes based on that registered application's particular characteristics and functionalities. For example, the originator application may be assigned to equivalence classes based on its file compatibilities, its program version, or various other characteristics and/or functionalities as discussed in relation to FIG. 2.

In block 304, the server may receive shared media from an originator application for delivery to the target device. For example, a user may want to send a picture from a picture-album application to another user's device. The picture-album application (i.e., the "originator application") may send the picture to be shared (i.e., the shared media) to the server for delivery to the other user's device (i.e., the target device). In an embodiment, the server may also receive some means for identifying the target device. For example, the server may receive a device ID from the originator application that the server may use to identify the target device. In a further example, the server may use the supplied device ID to fetch the identity of the target device associated with the device ID number from a database.

In another embodiment, the originator application may send shared media to the server for delivery to a plurality of target devices. For example, a user of a music-sharing application may want to send a particular song file to his friends' devices, or another user may wish to send a document file from her mobile device to a personal computer she uses at work and a tablet computer she uses at home. Specific embodiments of methods for receiving shared media for delivery to at least one target device are discussed below in context of FIGS. 7-9.

In block 306, the server may select a recipient application on the target device that shares the most equivalence classes with the originator application. For example, the originator application may belong to three equivalence classes based on the originator application's ability to open PDF file types, the originator's developer, and its version number. In a further example, the target device may have two potential recipient applications that have been previously registered with the server as described above in block 302. A first potential recipient application may be able to open PDF file types, but may not have the same developer or version number as the originator application. A second potential recipient application may also be able to open PDF file types and made by the same developer, but the second potential recipient application may be an earlier version of the originator application. In this example, the server may select the second potential recipient application for delivery of shared media because the second potential recipient application shares two equivalence classes with the originator application (i.e., the ability to open PDF file types and the same developer) while the first potential application only shares one equivalence class with the originator application (i.e., the ability to open PDF file types). In another embodiment, for multiple target devices, the server may similarly select a recipient application for each target device. An embodiment method for sending shared media to multiple target devices is described in more detail in context of FIG. 9.

In block 308, the server may send the shared media to the recipient application. In the above example, the server may send the shared media to the second potential recipient application because it has the most equivalence classes in common with the originator application (i.e., the ability to open PDF file types and the same application developer). The server may end performance of the method 300 in block 310.

Figure 4:
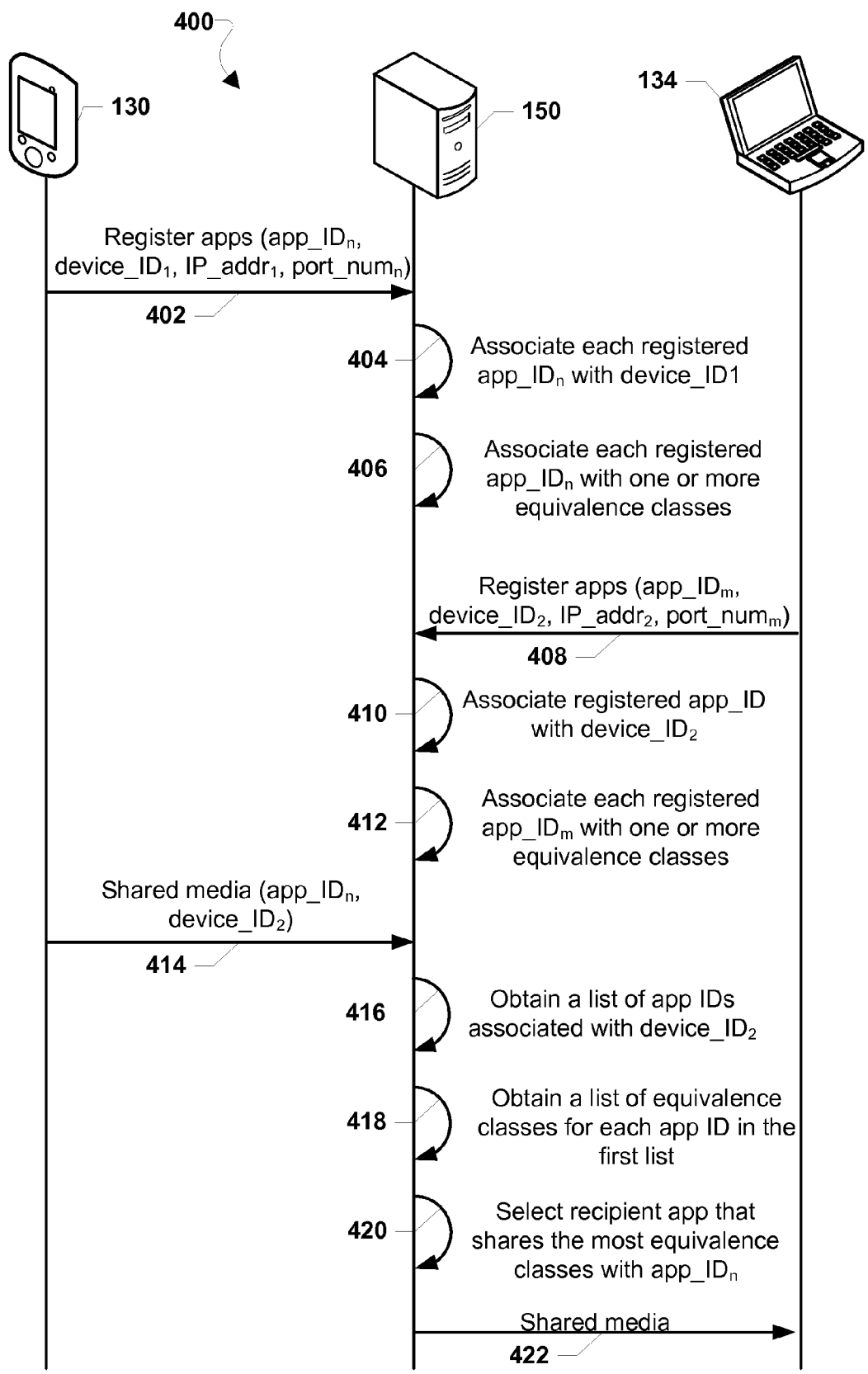
FIG. 4 illustrates a signaling and call flow according to an embodiment relationship between an originator device, a server, and a target device.

FIG. 4 illustrates signaling and call flows 400 among an originator device 130, a server 150, and a target device 134. An originator device 130 may register its applications (labeled as "app" in FIG. 4) with a server 150 by transmitting a registration signal 402 for one or more applications operating on the device. The registration signal 402 may include various data that the server 150 may use in the registration process. For example, the registration signal 402 may include the application ID for the registering application (i.e., "app_ID$_n$" in FIG. 4, wherein "n" is a non-negative integer corresponding to "n" number of applications operating on the originator device 130); the device ID for the originator device 130 (i.e., "device_ID$_1$" in FIG. 4); the IP address for the originator device 130 (i.e., "IP_addr$_1$" in FIG. 4); and the port number used by the registering application (i.e., "port_num$_n$" in FIG. 4).

In operation 404, the server 150 may associate the application ID for each registering application with the device ID of the originator device 130 (i.e., the registering device). Through this association, the server 150 may be able to determine later which device hosts a particular application ID and which application (or applications) operates on a device associated with a particular device ID. The server 150 may also associate each registering application with one or more equivalence classes in operation 406. As described in relation to FIG. 2, an equivalence class may include all applications that share one or more characteristics or functionalities that define the equivalence class. For example, an application being registered on the server 150 that is able to create MP3 file types may be put into an equivalence class defined by that functionality. Depending on the traits of a particular application, the application being registered may be associated with one or more equivalence classes.

The target device 134 may also register one or more of its applications (labeled as "app" in FIG. 4) with the server 150 by transmitting a registration signal 408 for each of its registering applications. The registration signal 408 may include various data that the server 150 may use in the registration process. For example, the registration signal 408 may include the application ID for the registering application (i.e., "app_ID$_m$" in FIG. 4, wherein "m" is a non-negative integer corresponding to "m" number of registering applications operating on the target device 134); the device ID for the target device 134 (i.e., "device_ID$_2$" in FIG. 4); the IP address for the target device 134 (i.e., "IP_addr$_2$" in FIG. 4); and the port number used by the registering application (i.e., "port_num$_m$" in FIG. 4).

In operation 410, the server 150 may associate each registering application's ID with the device ID of the target device 134. The server 150 may also associate each registering application on the target device 134 with one or more equivalence classes in operation 412 based on each registering application's particular characteristics and functionalities as described above in relation to FIG. 2. For example, if a particular developer created an application on the target device 134, that application may be associated with an equivalence class defined by that characteristic.

The originator device 130 may send a shared media signal 414 to the server 150. The shared media signal 414 may include media sent from an originator application (e.g., pictures, video, audio, files, etc.), the originator application's ID (i.e., app_ID$_n$), and the device ID (i.e., device_ID$_2$) for the target device 134 to which the originator application is sending the shared media. For example, a picture-album application on the originator device 130 may send a picture file to the server 150 and may include with that picture file its identification information (e.g., its application ID) and the target device 134's identification information (e.g., the target device's ID).

In operation 416, the server 150 may obtain a first list of applications associated with the target device 134's ID (e.g., "device_ID$_2$"). For example, "device_ID$_2$" may be associated with three registered applications. The server 150 may obtain a second list of equivalence classes for each registered application in the first list in operation 418. In the above example, the server 150 may obtain a list of all three applications' equivalence class memberships.

In operation 420, the server 150 may select the recipient application associated with the target device 134's ID that shares the most equivalence classes with the originator application. The server 150 may, for example, count the number of equivalences classes shared by the originator application and each application registered to the target device 134 and select the application that shares the most equivalence classes with the originator application.

After selecting the recipient application, the server 150 may send shared media 422 to the recipient application operating on the target device 134. By selecting a recipient application that shares the most equivalence classes with the originator application, the server 150 may succeed in sending the shared media to the application on the target device 134 that has the highest probability of being able to access and use the shared media based on its similarity to the originator application. For example, while the server 150 may send shared media to a particular recipient application on the target device 134 because that recipient application is capable of using the shared media, the server 150 may choose another recipient application that is more appropriate. In a further example, an originator application that processes and modifies audio files may intend to share an audio file with a similar recipient application. While the target device 134 has an application that can open and play audio files, the target device 134 may also have another application that can open and play audio files and also process and edit those files like the originator application. Therefore, by selecting a recipient application on the target device 134 that has the highest number of equivalence classes in common with the originator application, the server 150 may send shared media to the recipient application that has the highest probability of being the intended (or a more appropriate) recipient application.

Figure 5:
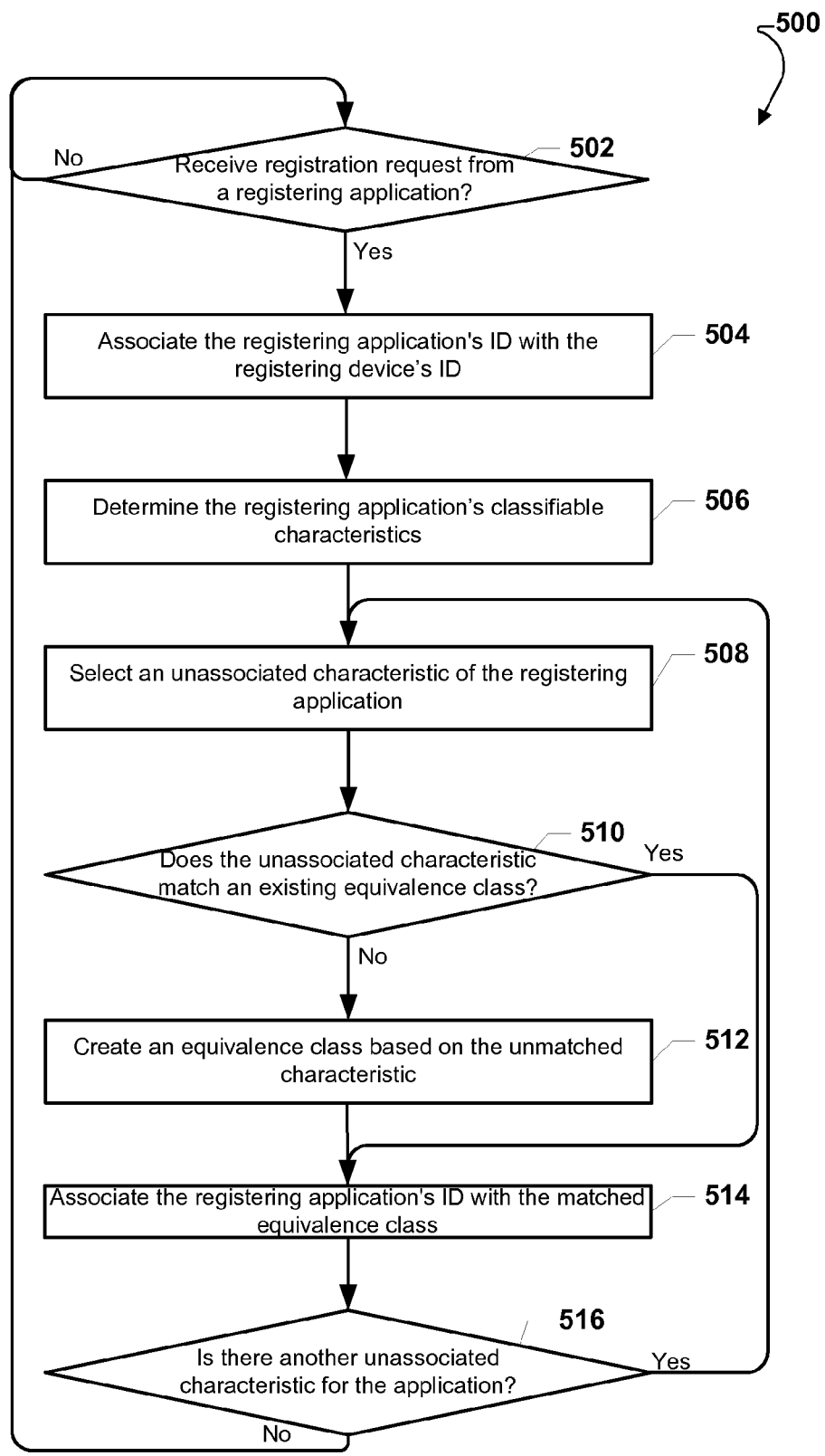
FIG. 5 is a process flow diagram illustrating an embodiment server method for registering an application with a server.

FIG. 5 illustrates an embodiment server method 500 for registering an application and associating that application with one or more equivalence classes. In determination block 502, the server may determine whether it has received a registration request from a registering application. A registration request may include, among other things, the registering application's ID and the registering application's device ID. If the server has not received a registration request from a registering application (i.e., determination block 502="No"), the server may continue operating in determination block 502. Otherwise (i.e., determination block 502="Yes"), the server may associate the registering application's ID with the registering application's device ID in block 504. In an embodiment, the registering application may send its application ID and device ID to the server. In another embodiment, the server may create or assign a unique ID for the registering application and create a unique ID for the registering application's device if the server does not recognize the device (i.e., if the device is not associated with any application).

In block 506, the server may determine the registering application's classifiable characteristics. In an embodiment, the server may evaluate any classifiable characteristic of the registering application, including the registering application's attributes and functionalities (e.g., the file types it may create or open and its capabilities). In a further embodiment, potentially classifiable characteristics of the registering application may include any of the following: the registering application's developer; its version; the types of files it may create, open, edit, or transmit; the intended user; various statistics regarding the frequency of its use; its association with other programs; and the types of media it is capable of sharing. For example, the registering application may be a digital video editing program. The server may be able to determine, for instance, that the digital video editing program was developed by a particular company and may open, modify, and create MP3 file types, as well as AVI file types.

The server may determine the registering application's classifiable characteristics in various other ways. In an embodiment, the server may be configured to receive metadata from the registering application that describe the registering application's characteristics and functionalities. The metadata may include information about the registering application's characteristics and functionality (e.g., the supported file extensions, the developer, etc.). In another embodiment, the registering application may have previously undergone an application onboarding process. For example, the application developer may have submitted the application's characteristics and functionalities as a part of the onboarding process, and these characteristics and functionalities may be made available to the server. When the registering application initiates the registration process with the server, the server may access the application's characteristics and functionalities that were disclosed during the application onboarding process.

The server may select an unassociated characteristic of the registering application in block 508. In an embodiment, an unassociated characteristic may be a characteristic of the registering application that the server has not yet associated with an equivalence class (i.e., the registering application's ID has not been associated with one or more equivalence classes defined by that characteristic). In the example above, the server may determine that the digital video editing application's ID has not been associated to an equivalence class defined by the ability to modify an MP3 file type. The server may then select that characteristic of the digital editing program.

In determination block 510, the server may determine whether the unassociated characteristic matches an existing equivalence class. In other words, the server may determine whether there are already one or more equivalence classes defined by the unassociated characteristic. For example, the server may determine whether there are one or more equivalence classes defined by an application's ability to modify an MP3 file type. If the unassociated characteristic does not match an existing equivalence class (i.e., determination block 510="No"), the server may create a new equivalence class based on the unmatched characteristic in block 512. This situation may occur when the selected unassociated characteristic does not fit any equivalence class and a new equivalence class must be created to represent the selected unassociated characteristic. The server may associate the registering application's ID with the matched equivalence class in block 514. The matched equivalence class in this case may be the new equivalence class based on the selected characteristic. If the unassociated characteristic does match an existing equivalence class (i.e., determination block 510="Yes"), the server may also associate the registering application's ID with the matched equivalence class in block 514.

In determination block 516, the server may determine whether there is another unassociated characteristic from the registering application. If there is another unassociated characteristic for the registering application (i.e., determination block 516="Yes"), the server may continue operating in block 508. Otherwise (i.e., determination block 516="No"), the server may continue operating in determination block 502.

Figure 6:
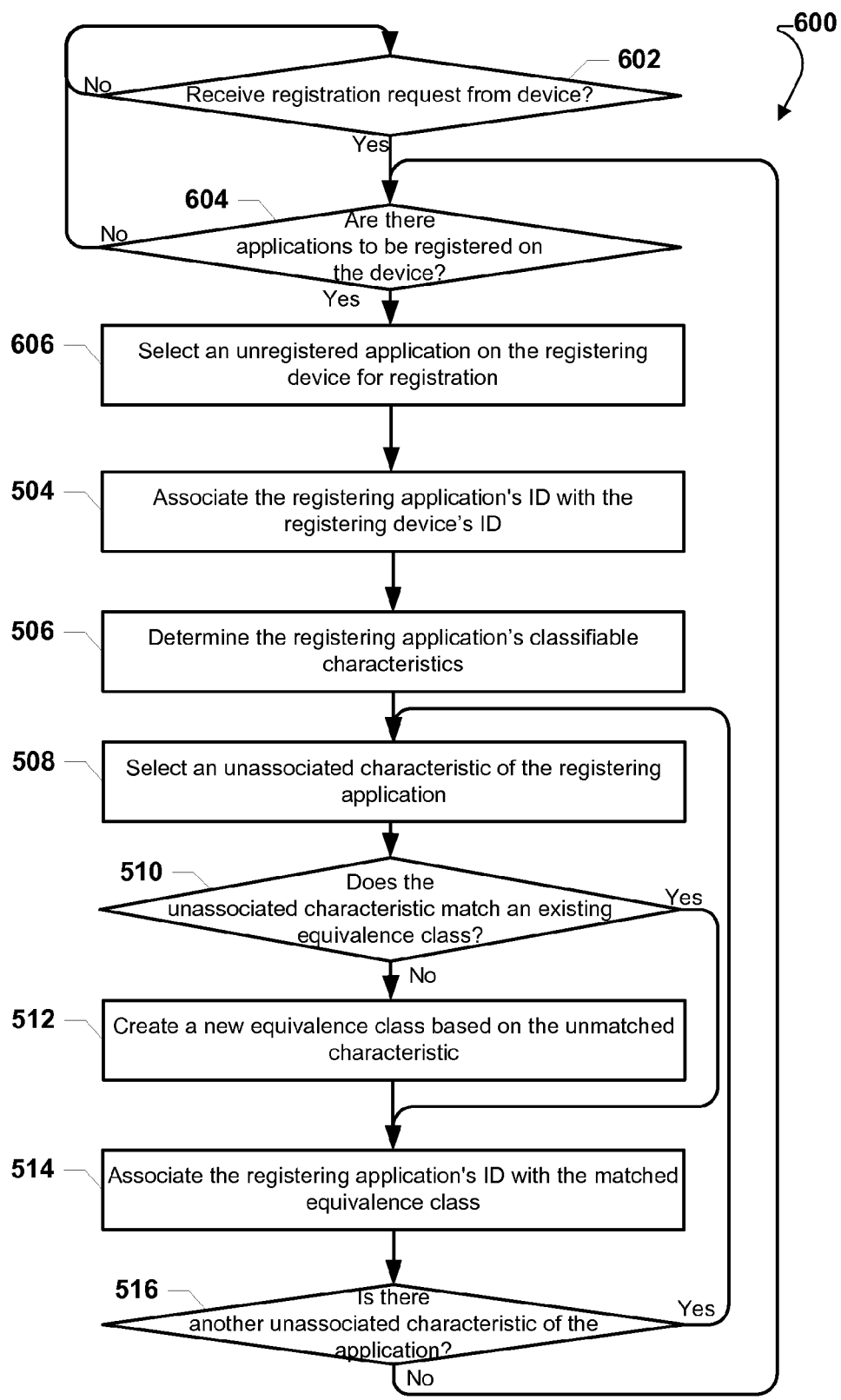
FIG. 6 is a process flow diagram illustrating an embodiment server method for registering applications on a device with a server.

FIG. 6 illustrates an embodiment server method 600 for registering applications on a device and associating those applications with one or more equivalence classes. In determination block 602, the server may determine whether it has received a registration request from a registering device. If the server has not received a registration request from a registering device (i.e., determination block 602="No"), the server may continue operating in determination block 602. Otherwise (i.e., determination block 602="Yes"), the server may determine in determination block 604 whether the device has applications to be registered. For example, a registering device may have previously registered its applications but has recently added one or more additional applications that have not been registered with the server. If there are no unregistered applications on the registering device (i.e., determination block 604="No"), the server may continue operating in determination block 602. The server may make this determination when, for example, the registering device has finished registering its applications or has no new applications to register.

If there are unregistered applications on the registering device (i.e., determination block 604="Yes"), the server may select an unregistered application on the registering device for registration in block 606. For example, if the registering device has three unregistered applications, the server may pick any one of those three unregistered applications for registration. In block 504, the server may associate the application's ID with the registering device's ID. In an embodiment, the registering application may send its application ID and its device ID to the server. In another embodiment, the server may create or assign a unique ID for the registering application and create a unique ID for the registering application's device if the registering device has not previously registered with the server.

In block 506, the server may determine the registering application's classifiable characteristics. In an aspect, the server may evaluate any classifiable characteristic of the registering application, including the registering application's attributes and functionalities (e.g., the file types it may create or open and its capabilities). In a further embodiment, potentially classifiable characteristics of the registering application may include any of the following: the registering application's developer; its version; the types of files it may create, open, edit, or transmit; the intended user; various statistics regarding the frequency of its use; its association with other programs; and the types of media it is capable of sharing. The server may obtain the registering application's classifiable characteristics in various ways (e.g., receiving metadata from the registering application or retrieving information about the registering application obtained through an application onboarding process).

The server may select an unassociated characteristic of the registering application in block 508. In an embodiment, the server may select the next characteristic of the registering application as described in reference to FIG. 5. For example, if the server determines that a digital video editing program's ability to modify an MP3 file type has not been used to associate the digital video editing program to an equivalence class, the server may then select that unassociated characteristic of the digital editing program.

In determination block 510, the server may determine whether the unassociated characteristic matches an existing equivalence class. If the unassociated characteristic does not match an existing equivalence class (i.e., determination block 510="No"), the server may create an equivalence class based on the unmatched characteristic in block 512. The server may then associate the registering application's ID with the matched equivalence class in block 514. In this case, the matched equivalence class may be a new equivalence class created in block 512. If the unassociated characteristic does match an existing equivalence class (i.e., determination block 510="Yes"), the server may also associate the registering application's ID with the matched equivalence class in block 514.

In determination block 516, the server may determine whether there is another unassociated characteristic of the registering application. If there is another unassociated characteristic for the registering application (i.e., determination block 516="Yes"), the server may continue operating in block 508. Otherwise (i.e., determination block 516="No"), the server may continue operating in determination block 604.

Figure 7:
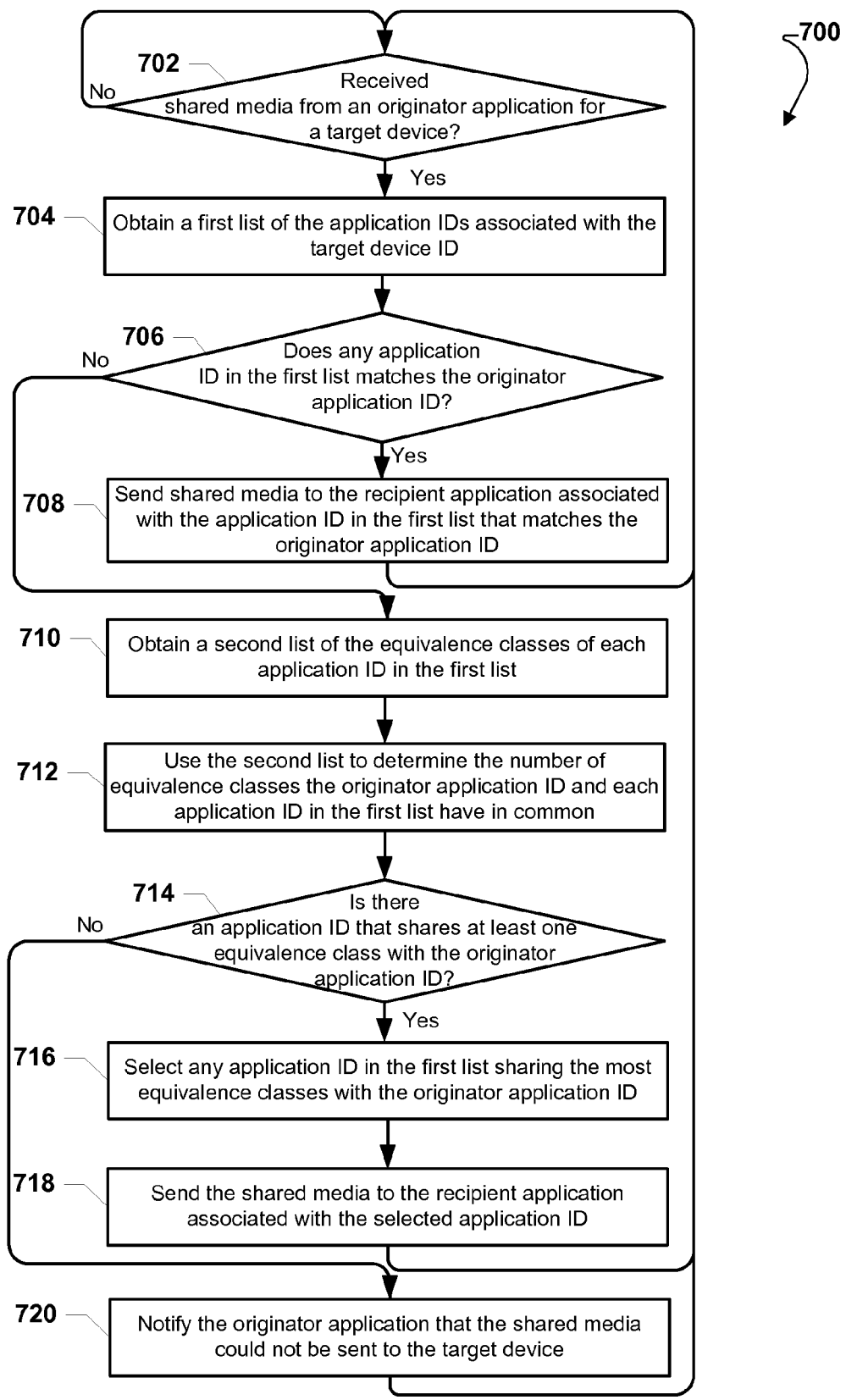
FIG. 7 is a process flow diagram illustrating an embodiment server method for determining an appropriate recipient application based on shared equivalence classes and delivering shared media from an originator application to that recipient application.

FIG. 7 illustrates an embodiment server method 700 for sending shared media from an originator application to one target device. In determination block 702, the server may determine whether it has received shared media from an originator application for delivery to a target device. In an embodiment, the originator application may send its application ID and the target device's ID to the server, in addition to the shared media. If the server has not received any shared media (i.e., determination block 702="No"), the server may continue operating in determination block 702 until it receives shared media from an originator application. Otherwise (i.e., determination block 702="Yes"), the server may obtain a first list of application IDs associated with the target device's ID in block 704. Because each application's ID is associated with a device ID, the server may be able to use the target device ID to determine the applications that are loaded on that target device. The server may maintain these relationships either locally or remotely in a database.

In determination block 706, the server may determine whether any of the application IDs in the first list of application IDs associated with the target device ID matches the originator application's ID. If there is an application ID in the first list of application IDs associated with the target device ID that matches the originator application's ID (i.e., determination block 706="Yes"), the server may send the shared media to the recipient application associated with the matching application ID in the first list in block 708. A matching application ID may indicate that the recipient application is a copy of the originator application (i.e., it shares every equivalence class with the originator application). For example, if the originator application's ID is "app_$ID_1$" and the target device has an application with an application ID of "app_$ID_1$," that application may be selected as the recipient application. The server may continue operating in determination block 702.

Otherwise, if the server determines that there is no application ID in the first list of application IDs associated with the target device ID that matches the originator application ID (i.e., determination block 706="No"), the server may obtain a second list of the equivalence classes of each application ID in the first list in block 710. The second list may indicate to which equivalence class or classes each application ID in the first list belongs. For example, if one of the application IDs in the first list is a music-playing application, the second list may indicate that the music-playing application's ID belongs to both an equivalence class defined by the ability to play MP3s and an equivalence class defined by a particular application developer.

In block 712, the server may use the second list to determine the number of equivalence classes the originator application ID and each application ID in the first list have in common. In an aspect, the server may determine the equivalence classes associated with the originator application's ID and compare those equivalence classes with the list of equivalence classes to which each application ID in the first list belongs (i.e., the second list). For example, after determining the originator application ID is associated with five equivalence classes, the server may use the second list to determine that a first application ID shares three equivalence classes with the originator application ID, that a second application ID shares two equivalence classes with the originator application ID, and that a third application ID shares four equivalence classes with the originator application ID.

In determination block 714, the server may determine whether there is an application ID in the first list of application IDs associated with the target device ID that shares at least one equivalence class with the originator application ID. If there is no application ID in the first list of application IDs associated with the target device ID that shares at least one equivalence class with the originator application ID (i.e., determination block 714="No"), the server may notify the originator application that the shared media could not be sent to the target device in block 720. This situation may occur, for example, when the originator application is independently developed (i.e., a "homebrew" application) and has uncommon features, is not widely available, or when the target device has very few applications.

If there is an application ID in the first list of application IDs associated with the target device ID that shares at least one equivalence class with the originator application ID (i.e., determination block 714="Yes"), the server, in block 716, may select any application ID in the first list of application IDs associated with the target device ID that shares the most number of equivalence classes with the originator application ID. In the example given above, the server may select the third application ID because that application ID has four equivalence classes in common with the originator application ID, whereas the first and second application IDs only have three and two equivalence classes in common with the originator application ID, respectively. In another example in which more than one application ID in the first list shares the most equivalence classes with the originator application ID (i.e., two or more application IDs that tie for the most shared equivalence classes), the server may use various methods for implementing a tie-breaker. In an embodiment, the server may compare the tying application IDs alphanumerically and may select the application ID with the lowest alphanumeric score. In another embodiment, the server may implement a tie-breaker by selecting the application ID associated with an application used the most on the target device. In block 718, the server may send the shared media to the recipient application associated with the selected application ID. The server may then continue operating in determination block 702.

Figure 8:
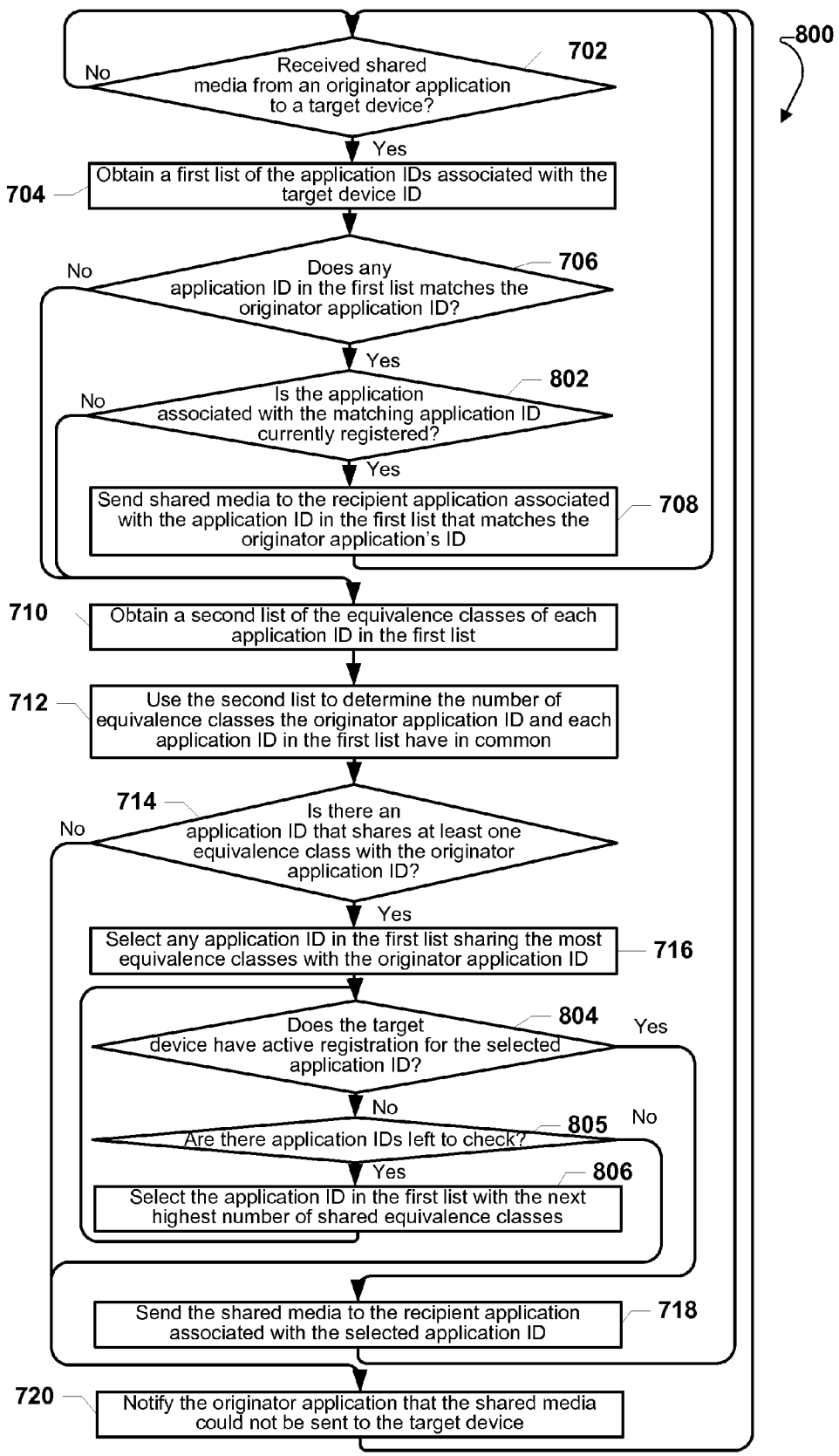
FIG. 8 is a process flow diagram illustrating an embodiment server method for determining an appropriate recipient application based on shared equivalence classes that are currently registered on the target device and delivering shared media from an originator application to that recipient application if it is currently registered on the target device.

FIG. 8 illustrates an embodiment server method 800 for sending shared media from an originator application to a recipient application currently registered to a target device. In determination block 702, the server may determine whether it has received shared media from an originator application for delivery to a target device. If the server has not received any shared media (i.e., determination block 702="No"), the server may continue operating in determination block 702 until it receives shared media from an originator application. Otherwise (i.e., determination block 702="Yes"), the server may obtain a first list of application IDs associated with the target device's ID in block 704. Because each registered application's ID is associated with a device ID, the server may be able to use the target device ID to determine the applications that are loaded on the target device. The server may retrieve these relationships from local storage or from a remote database.

In determination block 706, the server may determine whether any of the application IDs in the first list matches the originator application's ID. If there is an application ID associated with the target device's ID that matches the originator application's ID (i.e., determination block 706="Yes"), the server may determine whether an application with the matching application ID is currently registered on the target device in determination block 802. In other words, the server may determine whether the application with the matching application ID is installed or still operates on the target device. For example, the target device may have installed and registered an application with the server. At some later time, the target device may have uninstalled that application, and the server may determine in determination block 802 whether the application is still on the target device (i.e., whether the application is currently registered to the target device) before its attempts to send the shared media to that application.

If the server determines that an application with a matching application ID is currently registered on the target device (i.e., determine="Yes" because the application is still operating on the target device), the server may send the shared media to that application in block 708. In an aspect, the server may send the shared media to an application on the target device that has the same application ID as the originator application's ID because the applications are copies. By being a copy of the originator application, the application associated with the matching application ID has a very high likelihood of being an appropriate recipient application.

Otherwise, if the server determines that there is no application ID in the first list of application IDs associated with the target device ID that matches the originator application ID (i.e., determination block 706="No"), or if the server determines that a matching application ID is not currently registered on the target device (i.e., determination block 802="No"), the server may obtain a second list of the equivalence classes of each of the application IDs in the first list in block 710. For example, if one of the application IDs in the first list is associated with a word-processing application, the second list may indicate that the word-processing application ID belongs to two equivalence classes: an equivalence class defined by the ability to open .DOC files and an equivalence class defined by the ability to perform a spell-check function.

In block 712, the server may use the second list to determine the number of equivalence classes the originator application ID and each application ID in the first list have in common. In an embodiment, the server may determine the equivalence classes associated with the originator application's ID and compare those equivalence classes with the list of equivalence classes to which each application ID in the first list belongs (i.e., the second list).

In determination block 714, the server may determine whether an application ID in the first list shares at least one equivalence class with the originator application ID. If there is no application ID from the first list that shares at least one equivalence class with the originator application's ID (i.e., determination block 714="No"), the server may notify the originator application that the shared media could not be sent to the target device in block 720. Otherwise (i.e., determination block 714="Yes"), the server may select any application ID in the first list of application IDs associated with the target device ID that shares the most number of equivalence classes with the originator application ID in block 716. In an aspect in which more than one application IDs in the first list each have the most equivalence classes in common with the originator application's ID (i.e., there is a tie), the server may use various methods for implementing a tie-breaker. In an embodiment, the server may compare the application IDs alphanumerically and may select the application ID with the lowest alphanumeric score. In another embodiment, the server may implement a tie-breaker by selecting the application ID associated with the application used the most on the target device.

In determination block 804, the server may determine whether the target device has an active registration for the selected application ID. This determination may include checking with the target device to determine whether the application associated with the application ID is still operating on the target device. If the selected application ID is not active on the target device (i.e., determination block 804="No"), the server may determine whether there is an application ID in the first list left to check in determination block 805. In other words, the server may determine whether it has finished checking each application ID in the first list to see its associated application is registered to the target device. If the server discovers that no application associated with an application ID in the first list is actively registered to the target device (i.e., determination block 805="No"), the server may notify the originator application that the shared media could not be sent to the target device in block 720. This may be the case, for example, if the target device has uninstalled or otherwise removed the applications it had previously registered with the server. The server may then continue operating in determination block 702. If the server has not checked every application ID to determine whether any associated applications are actively registered on the target device (i.e., determination block 805="Yes"), the server may select an application ID in the first list with the next highest number of shared equivalence classes in block 806. In other words, the server may select a new recipient application associated with the application ID that has the next most number of equivalence classes in common with the originator application. In an embodiment, in the event that more than one application in the list has the highest number of shared equivalence classes, the server may use various methods to implement a tie-breaker as discussed above. The server may continue operating in determination block 804.

If the target device is actively registered on the target device (i.e., determination block 804="Yes"), the server may send the shared media to the recipient application associated with the selected application ID in block 718. The server may then continue operating in determination block 702.

Figure 9:
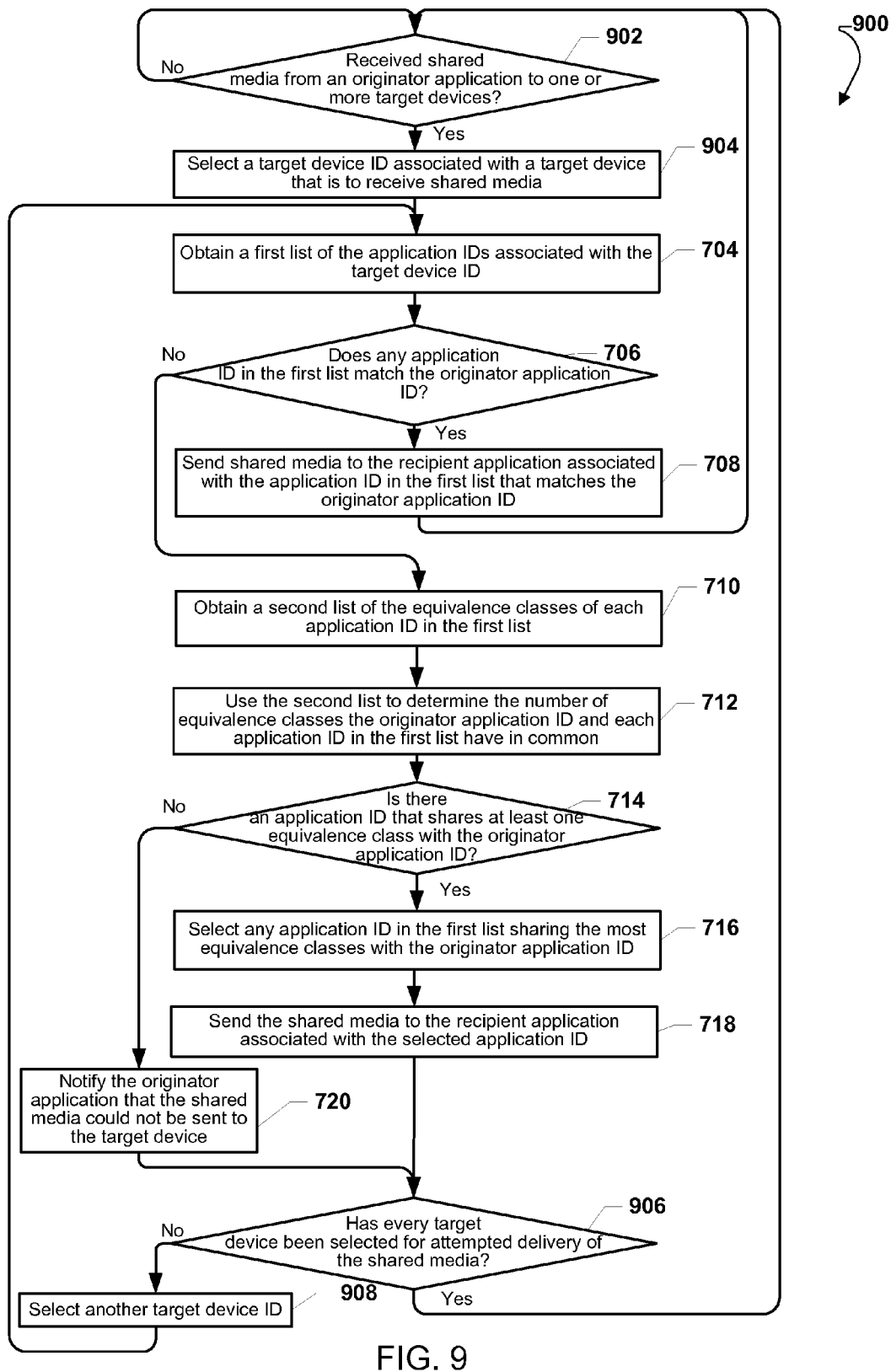
FIG. 9 is a process flow diagram illustrating an embodiment server method for delivering shared media from an originator application to a plurality of target devices by determining an appropriate recipient application for each individual target device based on shared equivalence classes.

FIG. 9 illustrates an embodiment server method 900 for sending shared media from an originator application to a plurality of target devices. In determination block 902, the server may determine whether it has received shared media from an originator application for delivery to one or more target devices. In an embodiment, the originator application may also send its application ID (i.e., the "originator application ID") and one or more target IDs. If the server has not received any shared media (i.e., determination block 902="No"), the server may continue operating in determination block 902 until it receives shared media from an originator application. Otherwise (i.e., determination block 902="Yes"), the server may select a device ID associated with a target device that is to receive shared media in block 904.

In block 704, the server may obtain a first list of application IDs associated with the target device ID in block 704. In an embodiment, the server may have selected the target device ID in block 904. Because each application ID in the first list is associated with a device ID, the server may be able to use the target device ID to determine the applications that are loaded on that device. The server may maintain these relationships by storing them locally or in a remote database.

In determination block 706, the server may determine whether any application ID in the first list matches the originator application ID. If there is an application ID in the first list of application IDs associated with the target device ID that matches the originator application's ID (i.e., determination block 706="Yes"), the server, in block 708, may send shared media to the recipient application associated with the application ID in the first list of application IDs associated with the target device ID that matches the originator application ID. In an embodiment, the server may send the shared media to an application on the target device that shares the same application ID as the originator application because a matching application ID indicates that the two applications are copies. Because they are copies (i.e., they share all equivalence classes), there is a high likelihood that the selected application is the most appropriate recipient.

Otherwise, if the server determines that there is no application ID in the first list of application IDs associated with the target device ID that matches the originator application's ID (i.e., determination block 706="No"), the server, in block 710, may obtain a second list of the equivalence classes for each of the application IDs in the first list. In an embodiment, the second list may indicate the equivalence classes of each application ID in the first list. For example, if one of the application IDs in the first list is associated with a music-playing application, the second list may indicate that that application ID is a member of two equivalence classes: one defined by the ability to play MP3s and another defined by the ability to download music from a particular online service.

In block 712, the server may use the second list to determine the number of equivalence classes the originator application ID and each application ID in the first list have in common, as discussed above in relation to block 712 in FIG. 7. In determination block 714, the server may determine whether an application ID from the first list shares at least one equivalence class with the originator application. If there is no application ID from the first list of application IDs associated with the target device ID that shares at least one equivalence class with the originator application (i.e., determination block 714="No"), the server may notify the originator application that the shared media could not be sent to the target device in block 720. As discussed above, the server may notify the originator application that the shared media could not be sent in situations including when a target device has only a few applications or has applications with uncommon features, such as "homemade" applications. In determination block 906, the server may determine whether every target device has been selected for attempted delivery of the shared media. If the server has not attempted to deliver the shared media to a device (i.e., determination block 906="No"), the server may select another target device ID in block 908. The server may then continue operating in block 704. If the server has selected every target device (i.e., determination block 906="Yes"), the server may continue operating in determination block 902.

If there is an application ID in the first list of application IDs associated with the target device ID that shares at least one equivalence class with the originator application (i.e., determination block 714="Yes"), the server may select any application ID in the first list of application IDs associated with the target device ID that shares the most number of equivalence classes with the originator application ID in block 716. For example, an application ID with four equivalence classes in common with the originator application may be selected over an application ID with only three equivalence classes in common with the originator application. In another example in which there are more than one application IDs in the first list of application IDs associated with the target device ID that have the most shared equivalence classes in common with the originator application ID, the server may use various methods for implementing a tie-breaker as discussed above in relation to block 716 in FIG. 7. In block 718, the server may send the shared media to the recipient application associated with the selected application ID in the first list.

In determination block 906, the server may determine whether every target device has been selected for attempted delivery of the shared media. If the server has not attempted to deliver the shared media to a device (i.e., determination block 906="No"), the server may select another target device ID in block 908. The server may then continue operating in block 704. If the server has selected every target device (i.e., determination block 906="Yes"), the server may continue operating in determination block 902.

Figure 10:
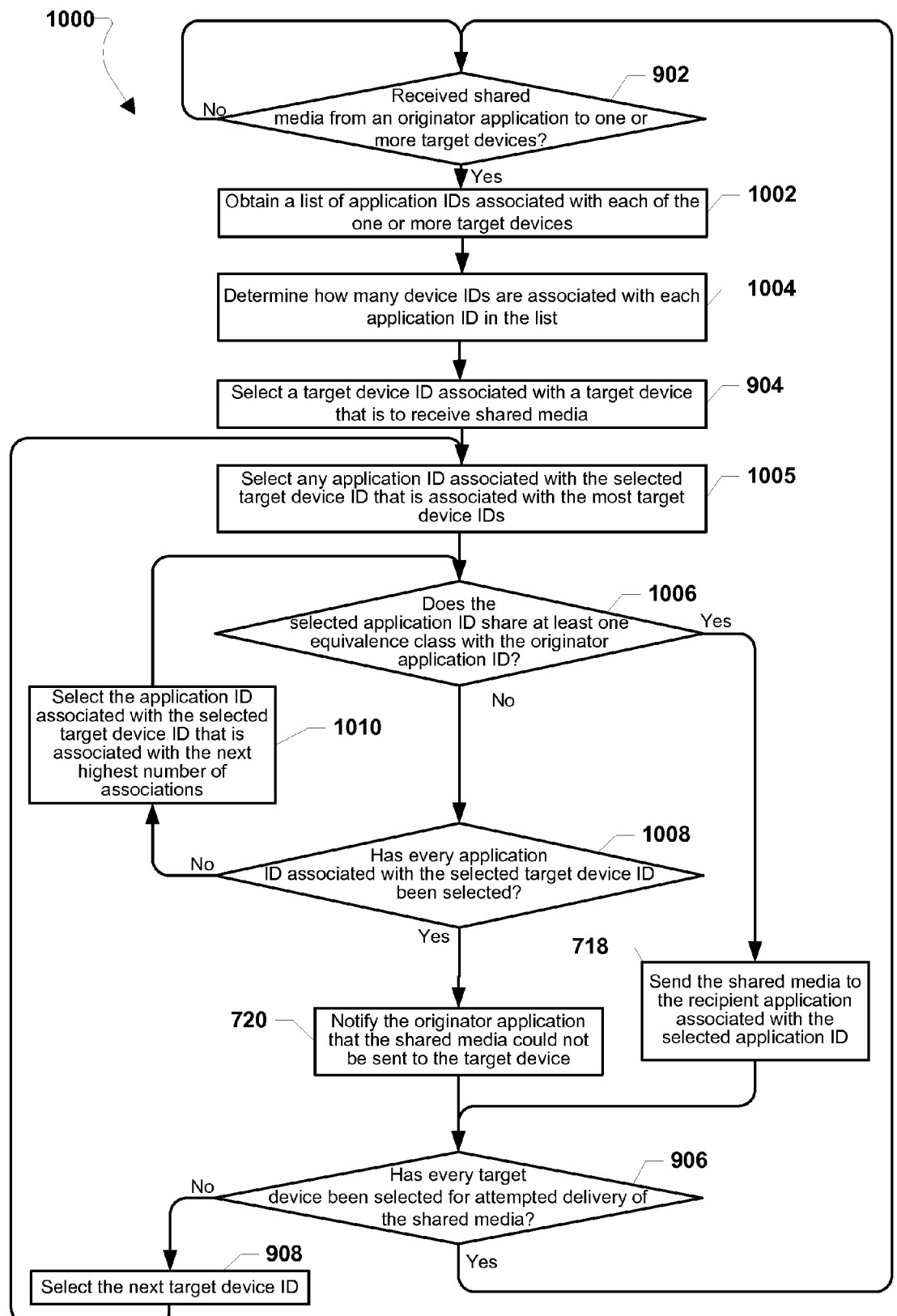
FIG. 10 is a process flow diagram illustrating an embodiment server method for delivering shared media from an originator application to a plurality of target devices by determining an appropriate recipient application on each target device based on the shared equivalence classes and the commonality of each potential recipient application.

FIG. 10 illustrates an embodiment server method 1000 for sending shared media from an originator application to a plurality of target devices based on which applications are common to the target devices. In determination block 902, a server may determine whether it has received shared media from an originator application for delivery to one or more target devices. If the server has not received shared media for delivery (i.e., determination block 902="No"), the server may continue operating in determination block 902.

Otherwise (i.e., determination block 902="Yes"), the server may obtain a list of application IDs associated with each of the one or more target devices in block 1002. For example, an originator application may request that the server deliver shared media to two target devices and may supply the server with those target devices' respective IDs. In a further example, the server may look up the application IDs associated with each device ID and determine that each device ID is associated with three application IDs. In block 1004, the server may determine how many device IDs are associated with each application ID in the list. In other words, the server may determine the number of times each application ID is repeated in the list. In the above example, the server may determine that of the six total application IDs associated with the two device IDs, there are only four unique application IDs because two unique application IDs are repeated (i.e., commonly associated with both device IDs).

In block 904, the server may select a device ID associated with a target device that is to receive shared media. For example, if the server has shared media for delivery to three target devices, the server may select any of the three target devices as the first recipient of the shared media. The server may also select any application ID associated with the selected device ID that is associated with the most device IDs in block 1005. In other words, the server may select an application ID in the list that is associated with the selected device ID and that is also associated with the highest number of device IDs. For example, if a device ID is associated with three application IDs, and each application ID is represented five, ten, and two times, respectively, in the list, the server may select the second respective application ID. The server may also implement a tie-breaker when two or more application IDs are equally the most represented in the list.

In determination block 1006, the server may determine whether the selected application ID shares at least one equivalence class with the originator application's ID. If the selected application ID does share at least one equivalence class with the originator application's ID (i.e., determination block 1006="Yes"), the server may send the shared media to a recipient application on the selected target device associated with the selected application ID in block 718. The server may determine in determination block 906 whether every target device has been selected for attempted delivery of the shared media. If one or more target devices have not been selected for delivery of the shared media (i.e., determination block 906="No"), the server may select another target device ID in block 908. The server may then continue operating in block 1005. If the server has selected every target device (i.e., determination block 906="Yes"), the server may continue operating in determination block 902.

If the selected application ID does not share at least one equivalence class with the originator application's ID (i.e., determination block 1006="No"), the server may determine in determination block 1008 whether every application ID associated with the selected target device ID has been selected. If one or more application IDs associated with the selected target device ID have not been selected (i.e., determination block 1008="No"), the server may select the application ID associated with the selected target device ID that is associated with the next highest number of associations in block 1010. In other words, the server may select the application ID that is associated with an application that is the next most common among the target devices. The server may continue operating in determination block 1006.

If every application ID associated with the selected target device ID has been selected (i.e., determination block 1008="Yes"), the server may notify the originator application that the shared media could not be delivered to that target device in block 720. For example, if the server has determined that no application ID associated with a particular device ID shares any equivalence classes with the originator application's ID, the server may determine that the target device is not capable of receiving the shared media because its applications have nothing in common with the originator application.

The server may also determine in determination block 906 whether every target device has been selected for attempted delivery of the shared media. If one or more target devices have not been selected for attempted delivery of the shared media (i.e., determination block 906="No"), the server may select another target device ID in block 908. The server may then continue operating in block 1005. If the server has selected every target device (i.e., determination block 906="Yes"), the server may continue operating in determination block 902.

Figure 11:
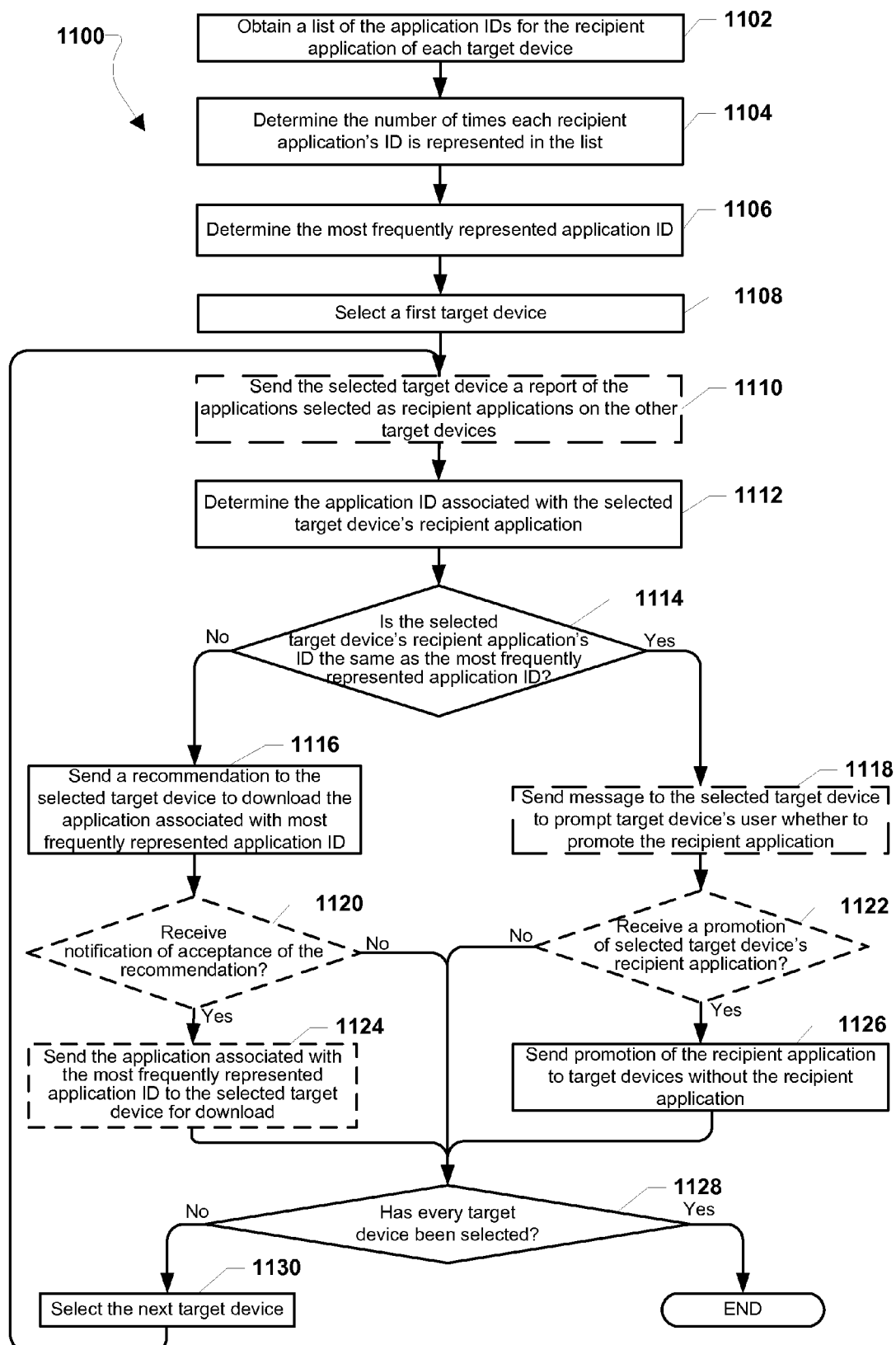
FIG. 11 is a process flow diagram illustrating an embodiment server method for recommending or promoting recipient applications to other target devices when an originator application sends shared media to a plurality of target devices.

FIG. 11 illustrates an embodiment server method 1100 for recommending or promoting recipient applications to other target devices when an originator application sends shared media to a plurality of target devices. In an embodiment, the server may perform the method 1100 at any point after it has determined the respective recipient applications for each target device. In a further embodiment, the server may perform this method 1100 before it has delivered the shared media to the target devices. For example, the server may determine each target device's recipient application and then perform the method 1100. In another embodiment, the server may perform this method 1100 after it has delivered the shared media to one or more target devices.

In an embodiment, the server may conduct communications with the target devices while performing this method 1100 in the same communication channel as the one used to deliver the shared media. In another embodiment, the server may conduct communications with the target devices while performing this method 1100 through a different communication channel.

In block 1102, the server may obtain a list of the application IDs for the recipient application of each target device. In an embodiment, the server may create the list after determining the recipient application for every target device. In another embodiment, the server may add to the list after it determines the recipient application for each target device (i.e., maintaining a running list). In an example, the server may obtain a list of three recipient application IDs corresponding to three respective target devices.

The server may determine the number of times each recipient application's ID is represented in the list in block 1104. In other words, the server may determine how many times a particular application ID is repeated in the list. The number of times a particular application ID appears in the list may indicate the number of target devices that have the same recipient application. For example, if there are two entries in the list for the application ID "App_ID$_2$," two target devices may have recipient applications associated with that particular application ID. In block 1106, the server may also determine the most frequently represented application ID. The most frequently represented application ID may be associated with the recipient application shared by the most target devices. In other words, the most frequently represented application ID is associated with the application through which the most target devices received the shared media (i.e., the recipient application). For example, if twenty out of twenty-five target devices received shared media with the same recipient application, the server may determine that the application ID associated with that recipient application is the most frequently represented.

In block 1108, the server may select a first target device. For example, the server may select a random target device or a target device chosen through a particular algorithm. The server may optionally send the selected target device a report of the applications selected as recipient applications on the other target devices in optional block 1110. In an embodiment, the report may enable the selected device or the selected device's user to know which applications were chosen as recipient applications on the other target devices. In a further embodiment, the report may provide the selected device's user with a snapshot of relationship between the recipient applications operating on other target devices and the origination application. For example, the selected device's user may see the names of each recipient application. In another example, the report may indicate how similar each recipient application is to the originator application. In a further example, the report may include the number of equivalence classes in common between each recipient application and the originator application (i.e., how similar each recipient application is to the originator application). In another example, the report may include broader descriptions of the relationship between each recipient application and the originator application (e.g., "very similar," "somewhat similar," and "barely similar"). In still another example, the report may provide a detailed list of the equivalence classes that were shared between each recipient application and the originator application (i.e., the shared functionality and capabilities).

In block 1112, the server may determine the application ID associated with the selected target device's recipient application. The server may also determine in determination block 1114 whether the selected target device's recipient application's ID is the same as the most frequently represented application ID. In an embodiment, the server may determine if these two application IDs are the same to determine whether the selected target device's recipient application is the recipient application selected on the most other target devices. For example, the selected target device's recipient application's ID may be "App_ID$_2$," which the server may have determined in block 1106 is the most frequently represented application ID in the list. Thus, the selected target device may have received the shared media on an application that the most other target devices used to receive the shared media.

If the selected device's recipient application's ID is the same as the most frequently represented application (i.e., determination block 1114="Yes"), the server may optionally send a message to the selected target device in optional block 1118, prompting the selected target device's user to promote the selected target device's recipient application. In an embodiment, a promotion may be a personal endorsement of the selected target device's recipient application or may be a suggestion or request for other users to download the selected device's recipient application. For example, a promotion may encourage other users to try the recipient application if they commonly receive a particular type of shared media (e.g., songs, .pdfs, video, text documents, etc.). In optional determination block 1122, the server may determine whether it has received a promotion of the selected target device's recipient application. If the server has not received a promotion (i.e., optional determination block 1122="No"), the server may continue operating in determination block 1128. Otherwise (i.e., optional determination block 1122="Yes"), the server may send the promotion of the selected device's recipient application to target devices that do not have the recipient application installed in block 1126. The server may then continue operating in determination block 1128.

If the selected device's recipient application's ID is not the same as the most frequently represented application (i.e., determination block 1114="No"), the server may send a recommendation to the selected target device's user to download the application associated with the most frequently represented application ID in block 1116. In an embodiment, the recommendation may be in the form of a prompt asking whether the selected target device's user would like to download the application associated with the most frequently represented application ID. The server may also determine in optional determination block 1120 whether it has received a notification of the acceptance of the recommendation. If the server does not receive a notification of acceptance of the recommendation (i.e., optional determination block 1120="No"), the server may continue operating in determination block 1128. Otherwise (i.e., optional determination block 1120="Yes"), the server may send the application associated with the most frequently represented application to the selected target device for download in optional block 1124. For example, upon receiving the recommendation from the server, the selected target device's user may accept the prompt to download the application associated with the most frequently represented application ID. In a further example, the selected target device may then install the application associated with the most frequently represented application ID. The server may then continue operating in determination block 1128.

In determination block 1128, the server may determine whether every target device has been selected. If every target device has been selected (i.e., determination block 1128="Yes"), the server may end performing method 1100. Otherwise, (i.e., determination block 1128="No"), the server may select the next target device in block 1130. In an embodiment, the server may select any target device that has not been selected. For example, if two target devices have not been selected, the server may select either target device. The server may then continue operating in optional block 1110.

Figure 12:
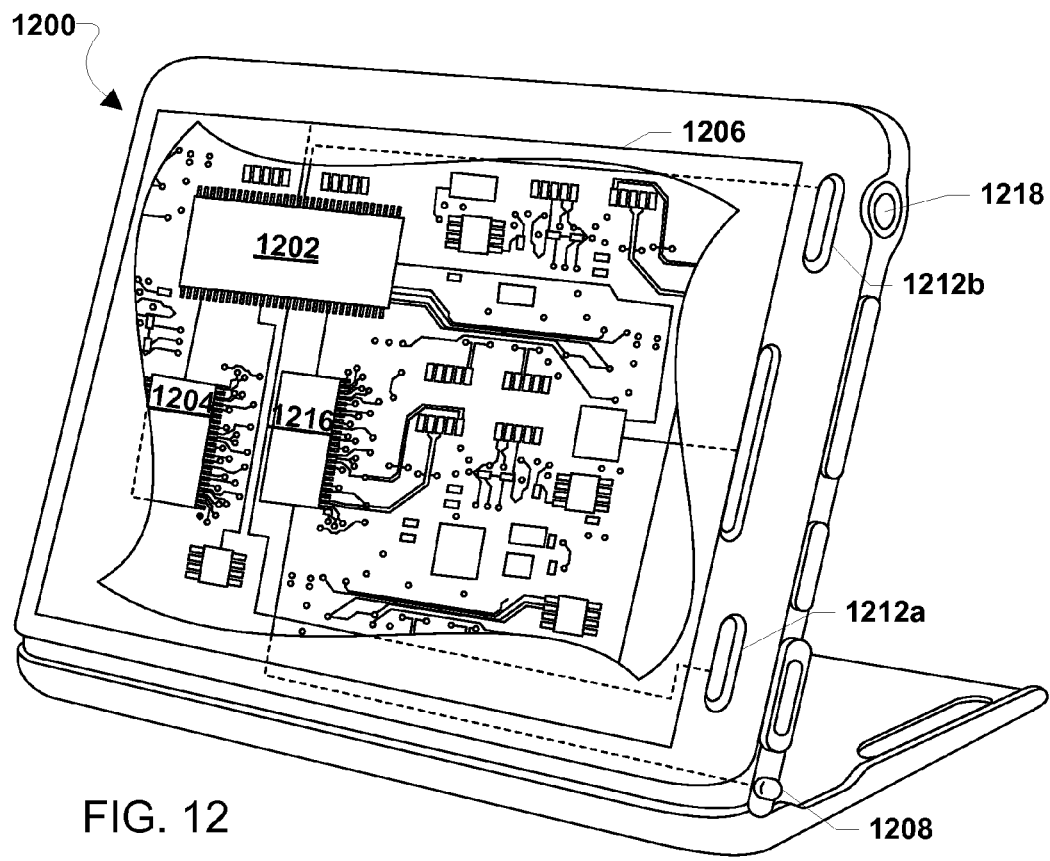
FIG. 12 is a component diagram of an example mobile device suitable for use with the various embodiments.

The various embodiments may be implemented in any of a variety of mobile devices, an example of which is illustrated in FIG. 12. For example, the mobile device 1200 may include a processor 1202 coupled to internal memory 1204 and 1210. Internal memory 1204 may be volatile or non-volatile memory, and may also be secure and/or encrypted memory, or unsecure and/or unencrypted memory, or any combination thereof. The processor 1202 may also be coupled to a touch screen display 1206, such as a resistive-sensing touch screen, capacitive-sensing touch screen infrared sensing touch screen, or the like. Additionally, the display of the mobile device 1200 need not have touch screen capability. Additionally, the mobile device 1200 may have one or more antenna 1208 for sending and receiving electromagnetic radiation that may be connected to a wireless data link and/or cellular telephone transceiver 1216 coupled to the processor 1202. The mobile device 1200 may also include physical buttons 1212a and 1212b for receiving user inputs. The mobile device 1200 may also include a power button 1218 for turning the mobile device 1200 on and off.

Figure 13:
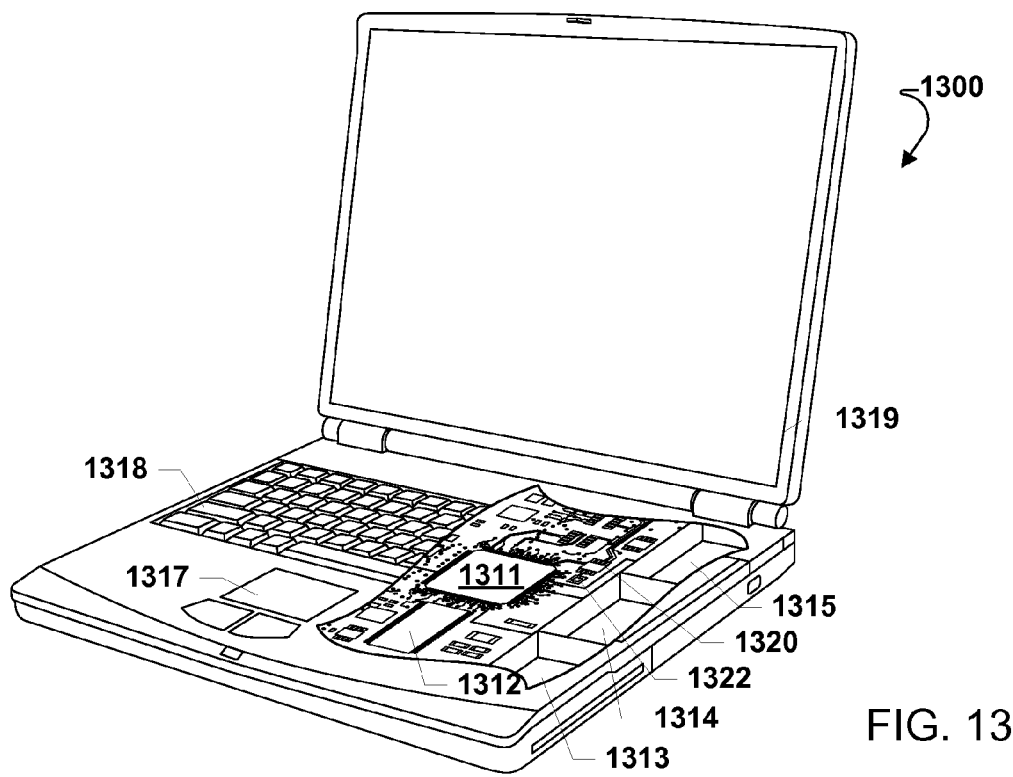
FIG. 13 is a component diagram of another example mobile device suitable for use with the various embodiments.

The various embodiments described above may also be implemented within a variety of mobile devices, such as a laptop computer 1300 illustrated in FIG. 13. Many laptop computers include a touch pad 1317 touch surface that serves as the computer's pointing device, and thus may receive drag, scroll, and flick gestures similar to those implemented on mobile computing devices equipped with a touch screen display and described above. A laptop computer 1300 may include a processor 1311 coupled to volatile memory 1312 and a large capacity nonvolatile memory, such as a disk drive 1313 of Flash memory. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be use in conjunction with the various embodiments. Additionally, the laptop computer 1300 may have one or more antenna 1322 for sending and receiving electromagnetic radiation that may be connected to a wireless data link and/or cellular telephone transceiver 1320 coupled to the processor 1311.

Figure 14:
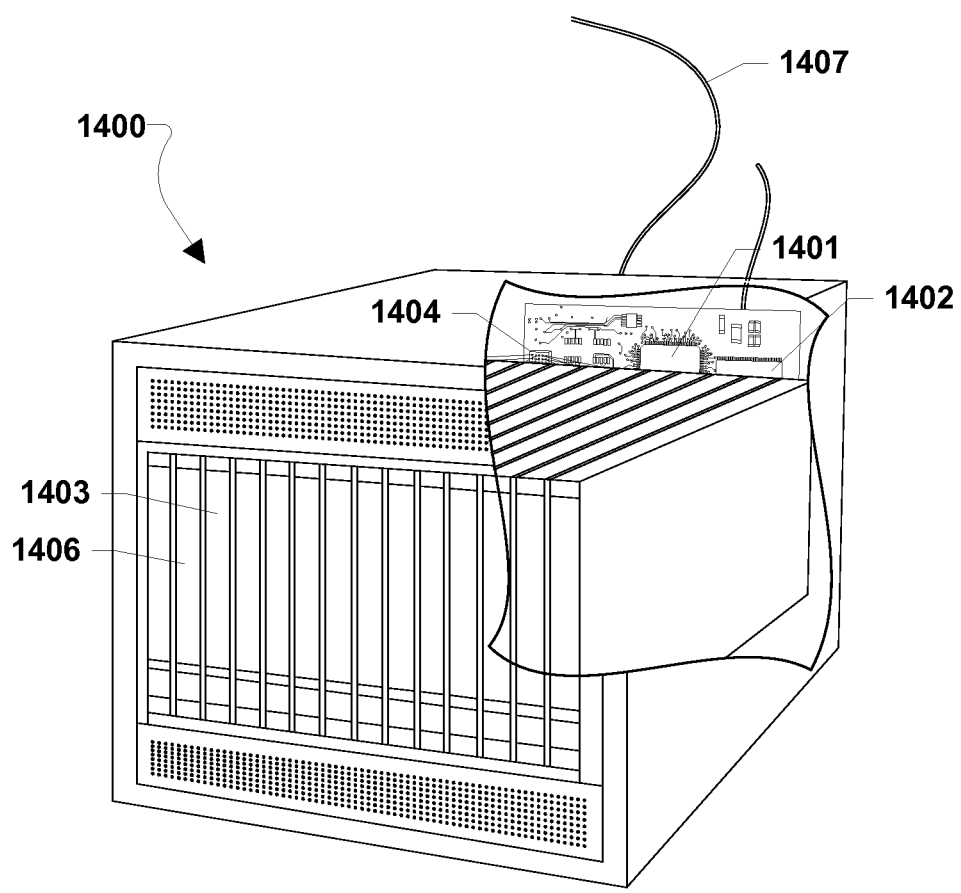
FIG. 14 is a component diagram of an example server suitable for use with the various embodiments.

The various embodiments may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1406 coupled to the processor 1401. The server 1400 may also include network access ports 1404 coupled to the processor 1401 for establishing data connections with a network 1407, such as a local area network coupled to other broadcast system computers and servers or to the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory server-readable medium. The steps of a method or algorithm disclosed herein may be embodied in a server-executable software module that may reside on a non-transitory computer-readable or server-readable storage medium. Non-transitory computer-readable or server-readable storage media may be any storage media that may be accessed by a computer or a processor. By way of example but not limitation, such non-transitory computer-readable or server-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and server-readable media. Additionally, the operations of a method or algorithm may reside as one or any combination or set of codes and/or instructions on a non-transitory server-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for selecting on a server a recipient application operating on a target device to receive media from an originator application based on characteristics shared by the originator application and the recipient application, comprising:
    registering each of the originator application and at least one application operating on the target device;
    associating each registering application with one or more equivalence classes, wherein each registering application is one of the originator application and the at least one application operating on the target device;
    receiving from the originator application a request to share the media with the target device;
    selecting the recipient application operating on the target device, wherein the recipient application is one of the at least one application operating on the target device; and
    sending shared media to the recipient application operating on the target device.

2. The method of claim 1, wherein registering comprises associating a registering application's application identifier (ID) with the registering application's device ID.

3. The method of claim 1, wherein associating each registering application with the one or more equivalence classes comprises:
    determining a registering application's classifiable characteristics;
    matching each classifiable characteristic to at least one equivalence class; and
    associating the registering application's application ID with each matching equivalence class.

4. The method of claim 3, wherein an equivalence class is defined by at least one of the registering application's characteristics, functionalities, and capabilities.

5. The method of claim 3, wherein determining the registering application's classifiable characteristics comprises receiving metadata from the registering application regarding the registering application's classifiable characteristics.

6. The method of claim 3, wherein determining the registering application's classifiable characteristics comprises receiving information regarding the registering application's classifiable characteristics as part of an application onboarding process.

7. The method of claim 3, further comprising:
    creating a new equivalence class for an unmatched classifiable characteristic; and
    matching the unmatched classifiable characteristic with the new equivalence class.

8. The method of claim 1, wherein the request to share the media with the target device comprises:
    a target device ID associated with the target device;
    an originator application ID associated with the originator application; and
    the shared media.

9. The method of claim 8, wherein selecting the recipient application operating on the target device comprises:
    obtaining a first list of application IDs associated with the target device ID;
    obtaining a second list of equivalence classes of each application ID in the first list of application IDs associated with the target device ID;
    determining for each application ID in the first list of application IDs associated with the target device ID a number of equivalence classes that the originator application ID and each respective application ID in the first list of application IDs associated with the target device ID have in common; and selecting the recipient application, wherein the recipient application is an application associated with a particular application ID in the first list of application IDs associated with the target device ID that has a highest number of equivalence classes in common with the originator application ID.

10. The method of claim 9, further comprising notifying the originator application that the shared media could not be sent to the target device in response to determining that no application ID in the first list of application IDs associated with the target device ID has at least one equivalence class in common with the originator application ID.

11. The method of claim 10, further comprising:
determining whether an application ID in the first list of application IDs associated with the target device ID matches the originator application ID; and
selecting an application associated with the application ID in the first list in response to determining that the application ID in the first list matches the originator application ID.

12. The method of claim 10, further comprising:
determining whether the selected recipient application is actively registered to the target device; and
selecting a new recipient application when the selected recipient application is not actively registered to the target device, wherein the new recipient application is an application associated with an application ID in the first list of application IDs associated with the target device ID that shares a next highest number of equivalence classes with the originator application ID.

13. A method for selecting on a server a recipient application for each of a plurality of target devices to receive media from an originator application based on characteristics shared by the originator application and the recipient application, comprising:
registering each of the originator application and at least one application operating respectively on each of the plurality of target devices;
associating each registering application with one or more equivalence classes, wherein each registering application is one of the originator application and the at least one application operating respectively on each of the plurality of target devices;
receiving from the originator application a request to share the media with each of the plurality of target devices;
selecting the recipient application operating on each of the plurality of target devices, wherein the recipient application is one of the at least one application operating respectively on each of the plurality of target devices; and
sending shared media to the recipient application operating on each of the plurality of target devices.

14. The method of claim 13, wherein registering comprises associating a registering application's application identifier (ID) with the registering application's device ID.

15. The method of claim 13, wherein associating each registering application with the one or more equivalence classes comprises:
determining a registering application's classifiable characteristics;
matching each classifiable characteristic to at least one equivalence class; and
associating the registering application's application ID with each matching equivalence class.

16. The method of claim 15, wherein an equivalence class is defined by at least one of the registering application's characteristics, functionalities, and capabilities.

17. The method of claim 15, wherein determining the registering application's classifiable characteristics comprises receiving metadata from the registering application regarding the registering application's classifiable characteristics.

18. The method of claim 15, wherein determining the registering application's classifiable characteristics comprises receiving information regarding the registering application's classifiable characteristics as part of an application onboarding process.

19. The method of claim 15, further comprising:
creating a new equivalence class for an unmatched classifiable characteristic; and
matching the unmatched classifiable characteristic with the new equivalence class.

20. The method of claim 13, wherein the request to share the media with each of the plurality of target devices comprises:
a plurality of target device IDs associated with the plurality of target devices, wherein each target device ID is associated with only one target device;
an originator application ID associated with the originator application; and
the shared media.

21. The method of claim 20, wherein selecting the recipient application operating on each of the plurality of target devices comprises:
determining a number of the plurality of target device IDs that share an association with a particular application ID;
selecting a target device ID, wherein the selected target device ID is one of the plurality of target device IDs;
selecting an application ID associated with the selected target device ID, wherein the selected application ID is associated with the most target devices in the plurality of target devices; and
selecting the recipient application, wherein the recipient application is an application associated with the selected application ID.

22. The method of claim 21, further comprising selecting a next target device ID, wherein the next target device ID is one of the plurality of target device IDs that has not previously been selected.

23. The method of claim 21, further comprising:
determining whether the selected recipient application is actively registered to a target device associated with the selected target device ID; and
selecting a new recipient application when the selected recipient application is not actively registered to the target device.

24. The method of claim 21, further comprising:
determining whether the selected application ID shares at least one equivalence class with the originator application ID; and
sending the shared media to the recipient application associated with the selected application ID in response to determining that the selected application ID shares at least one equivalence class with the originator application ID.

25. The method of claim 24, further comprising selecting a next application ID associated with the selected target device ID in response to determining that the selected application ID shares no equivalence classes with the originator application, wherein the next application ID is an application ID associated with the selected target device ID that is associated with a next highest number of target device IDs in the plurality of target device IDs.

26. The method of claim 25, further comprising notifying the originator application that the shared media could not be sent to a target device associated with the selected target device ID in response to determining that no application ID associated with the selected target device ID shares an equivalence class with the originator application ID.

27. The method of claim 13, further comprising:
obtaining a list of application IDs associated with the recipient applications selected on the plurality of target devices, wherein each application ID of the list is associated with only one recipient application;
determining a number of times each application ID associated with one of the plurality of target devices is represented in the list;
determining a most frequently represented application ID;
selecting one of the plurality of target devices;
determining an application ID associated with the selected target device's recipient application;
determining whether the application ID associated with the selected target device's recipient application matches the most frequently represented application ID;
promoting the target device's recipient application in response to determining there is a match between the application ID associated with the selected target device's recipient application and the most frequently represented application ID; and
recommending an application associated with the most frequently represented application ID when the application ID associated with the selected target device's recipient application does not match the most frequently represented application ID.

28. The method of claim 27, further comprising sending the selected target device a report of applications selected as recipient applications on each of the plurality of target devices.

29. The method of claim 27, wherein promoting the target device's recipient application comprises sending a recommendation to the selected target device to download the application associated with the most frequently represented application ID.

30. The method of claim 29, wherein promoting the target device's recipient application further comprises:
receiving a notification of acceptance of the recommendation; and
sending the application associated with the most frequently represented application ID to the selected target device for download.

31. The method of claim 27, wherein promoting the target device's recipient application comprises sending a promotion of the selected target device's recipient application to target devices in the plurality of target devices that do not have the selected target device's recipient application.

32. The method of claim 31, wherein promoting the target device's recipient application comprises:
sending a message to the selected target device to prompt a user of the target device to promote the selected target device's recipient application; and
receiving the promotion of the selected target device's recipient application.

33. A server, comprising:
means for registering each of an originator application and at least one application operating on a target device;
means for associating each registering application with one or more equivalence classes, wherein each registering application is one of the originator application and the at least one application operating on the target device;
means for receiving from the originator application a request to share media with the target device;
means for selecting a recipient application operating on the target device, wherein the recipient application is one of the at least one application operating on the target device; and
means for sending shared media to the recipient application operating on the target device.

34. The server of claim 33, wherein means for registering each of an originator application and at least one application operating on a target device comprises means for associating a registering application's application identifier (ID) with the registering application's device ID.

35. The server of claim 33, wherein means for associating each registering application with the one or more equivalence classes comprises:
means for determining a registering application's classifiable characteristics;
means for matching each classifiable characteristic to at least one equivalence class; and
means for associating the registering application's application ID with each matching equivalence class.

36. The server of claim 35, wherein an equivalence class is defined by at least one of the registering application's characteristics, functionalities, and capabilities.

37. The server of claim 35, wherein means for determining the registering application's classifiable characteristics comprises means for receiving metadata from the registering application regarding the registering application's classifiable characteristics.

38. The server of claim 35, wherein means for determining the registering application's classifiable characteristics comprises means for receiving information regarding the registering application's classifiable characteristics as part of an application onboarding process.

39. The server of claim 35, further comprising:
means for creating a new equivalence class for an unmatched classifiable characteristic; and
means for matching the unmatched classifiable characteristic with the new equivalence class.

40. The server of claim 33, wherein means for receiving from the originator application a request to share media with the target device comprises means for receiving:
a target device ID associated with the target device;
an originator application ID associated with the originator application; and
the shared media.

41. The server of claim 40, wherein means for selecting the recipient application operating on the target device comprises:
means for obtaining a first list of application IDs associated with the target device ID;
means for obtaining a second list of equivalence classes of each application ID in the first list of application IDs associated with the target device ID;
means for determining for each application ID in the first list of application IDs associated with the target device ID a number of equivalence classes that the originator application ID and each respective application ID in the first list of application IDs associated with the target device ID have in common; and
means for selecting the recipient application, wherein the recipient application is an application associated with a particular application ID in the first list of application IDs associated with the target device ID that has a highest number of equivalence classes in common with the originator application ID.

42. The server of claim 41, further comprising means for notifying the originator application that the shared media could not be sent to the target device in response to determining that no application ID in the first list of application IDs associated with the target device ID has at least one equivalence class in common with the originator application ID.

43. The server of claim 42, further comprising:
means for determining whether an application ID in the first list of application IDs associated with the target device ID matches the originator application ID; and
means for selecting an application associated with the application ID in the first list in response to determining that the application ID in the first list matches the originator application ID.

44. The server of claim 42, further comprising:
means for determining whether the selected recipient application is actively registered to the target device; and
means for selecting a new recipient application when the selected recipient application is not actively registered to the target device, wherein the new recipient application is an application associated with an application ID in the first list of application IDs associated with the target device ID that shares a next highest number of equivalence classes with the originator application ID.

45. A server, comprising:
means for registering each of an originator application and at least one application operating respectively on each of a plurality of target devices;
means for associating each registering application with one or more equivalence classes, wherein each registering application is one of the originator application and the at least one application operating respectively on each of the plurality of target devices;
means for receiving from the originator application a request to share media with each of the plurality of target devices;
means for selecting a recipient application operating on each of the plurality of target devices, wherein the recipient application is one of the at least one application operating respectively on each of the plurality of target devices; and
means for sending shared media to the recipient application operating on each of the plurality of target devices.

46. The server of claim 45, wherein means for registering comprises means for associating a registering application's application identifier (ID) with the registering application's device ID.

47. The server of claim 45, wherein means for associating each registering application with the one or more equivalence classes comprises:
means for determining a registering application's classifiable characteristics;
means for matching each classifiable characteristic to at least one equivalence class; and
means for associating the registering application's application ID with each matching equivalence class.

48. The server of claim 47, wherein an equivalence class is defined by at least one of the registering application's characteristics, functionalities, and capabilities.

49. The server of claim 47, wherein means for determining the registering application's classifiable characteristics comprises means for receiving metadata from the registering application regarding the registering application's classifiable characteristics.

50. The server of claim 47, wherein means for determining the registering application's classifiable characteristics comprises means for receiving information regarding the registering application's classifiable characteristics as part of an application onboarding process.

51. The server of claim 47, further comprising:
means for creating a new equivalence class for an unmatched classifiable characteristic; and
means for matching the unmatched classifiable characteristic with the new equivalence class.

52. The server of claim 45, wherein means for receiving from the originator application a request to share media with each of the plurality of target devices comprises means for receiving:
a plurality of target device IDs associated with the plurality of target devices, wherein each target device ID is associated with only one target device;
an originator application ID associated with the originator application; and
the shared media.

53. The server of claim 52, wherein means for selecting the recipient application operating on each of the plurality of target devices comprises:
means for determining a number of the plurality of target device IDs that share an association with a particular application ID;
means for selecting a target device ID, wherein the selected target device ID is one of the plurality of target device IDs;
means for selecting an application ID associated with the selected target device ID, wherein the selected application ID is associated with the most target devices in the plurality of target devices; and
means for selecting the recipient application, wherein the recipient application is an application associated with the selected application ID.

54. The server of claim 53, further comprising means for selecting a next target device ID, wherein the next target device ID is one of the plurality of target device IDs that has not previously been selected.

55. The server of claim 53, further comprising:
means for determining whether the selected recipient application is actively registered to a target device associated with the selected target device ID; and
means for selecting a new recipient application when the selected recipient application is not actively registered to the target device.

56. The server of claim 53, further comprising:
means for determining whether the selected application ID shares at least one equivalence class with the originator application ID; and
means for sending the shared media to the recipient application associated with the selected application ID in response to determining that the selected application ID shares at least one equivalence class with the originator application ID.

57. The server of claim 56, further comprising means for selecting a next application ID associated with the selected target device ID in response to determining that the selected application ID shares no equivalence classes with the originator application, wherein the next application ID is an application ID associated with the selected target device ID that is associated with a next highest number of target device IDs in the plurality of target device IDs.

58. The server of claim 57, further comprising means for notifying the originator application that the shared media could not be sent to a target device associated with the selected target device ID in response to determining that no application ID associated with the selected target device ID shares an equivalence class with the originator application ID.

59. The server of claim 45, further comprising:
  means for obtaining a list of application IDs associated with the recipient applications selected on the plurality of target devices, wherein each application ID of the list is associated with only one recipient application;
  means for determining a number of times each application ID associated with one of the plurality of target devices is represented in the list;
  means for determining a most frequently represented application ID;
  means for selecting one of the plurality of target devices;
  means for determining an application ID associated with the selected target device's recipient application;
  means for determining whether the application ID associated with the selected target device's recipient application matches the most frequently represented application ID;
  means for promoting the target device's recipient application in response to determining there is a match between the application ID associated with the selected target device's recipient application and the most frequently represented application ID; and
  means for recommending an application associated with the most frequently represented application ID when the application ID associated with the selected target device's recipient application does not match the most frequently represented application ID.

60. The server of claim 59, further comprising means for sending the selected target device a report of applications selected as recipient applications on each of the plurality of target devices.

61. The server of claim 59, wherein means for promoting the target device's recipient application comprises means for sending a recommendation to the selected target device to download the application associated with the most frequently represented application ID.

62. The server of claim 61, wherein means for promoting the target device's recipient application further comprises:
  means for receiving a notification of acceptance of the recommendation; and
  means for sending the application associated with the most frequently represented application ID to the selected target device for download.

63. The server of claim 59, wherein means for promoting the target device's recipient application comprises means for sending a promotion of the selected target device's recipient application to target devices in the plurality of target devices that do not have the selected target device's recipient application.

64. The server of claim 63, wherein means for promoting the target device's recipient application comprises:
  means for sending a message to the selected target device to prompt a user of the target device to promote the selected target device's recipient application; and
  means for receiving the promotion of the selected target device's recipient application.

65. A server, comprising:
  a processor configured with processor-executable instructions to perform operations comprising:
    registering each of an originator application and at least one application operating on a target device;
    associating each registering application with one or more equivalence classes, wherein each registering application is one of the originator application and the at least one application operating on the target device;
    receiving from the originator application a request to share media with the target device;
    selecting an recipient application operating on the target device, wherein the recipient application is one of the at least one application operating on the target device; and
    sending shared media to the recipient application operating on the target device.

66. The server of claim 65, wherein the processor is configured with processor-executable instructions to perform operations such that registering comprises associating a registering application's application identifier (ID) with the registering application's device ID.

67. The server of claim 65, wherein the processor is configured with processor-executable instructions to perform operations such that associating each registering application with the one or more equivalence classes comprises:
  determining a registering application's classifiable characteristics;
  matching each classifiable characteristic to at least one equivalence class; and
  associating the registering application's application ID with each matching equivalence class.

68. The server of claim 67, wherein the processor is configured with processor-executable instructions to perform operations such that an equivalence class is defined by at least one of the registering application's characteristics, functionalities, and capabilities.

69. The server of claim 67, wherein the processor is configured with processor-executable instructions to perform operations such that determining the registering application's classifiable characteristics comprises receiving metadata from the registering application regarding the registering application's classifiable characteristics.

70. The server of claim 67, wherein the processor is configured with processor-executable instructions to perform operations such that determining the registering application's classifiable characteristics comprises receiving information regarding the registering application's classifiable characteristics as part of an application onboarding process.

71. The server of claim 67, wherein the processor is configured with processor-executable instructions to perform operations further comprising:
  creating a new equivalence class for an unmatched classifiable characteristic; and
  matching the unmatched classifiable characteristic with the new equivalence class.

72. The server of claim 65, wherein the processor is configured with processor-executable instructions to perform operations such that the request to share the media with the target device comprises:
  a target device ID associated with the target device;
  an originator application ID associated with the originator application; and
  the shared media.

73. The server of claim 72, wherein the processor is configured with processor-executable instructions to perform operations such that selecting the recipient application operating on the target device comprises:
  obtaining a first list of application IDs associated with the target device ID;
  obtaining a second list of equivalence classes of each application ID in the first list of application IDs associated with the target device ID;
  determining for each application ID in the first list of application IDs associated with the target device ID a number of equivalence classes that the originator application ID and each respective application ID in the first list of application IDs associated with the target device ID have in common; and selecting the recipient application, wherein the recipient application is an application associated with a particular application ID in the first list of application IDs associated with the target device ID that has a highest number of equivalence classes in common with the originator application ID.

74. The server of claim 73, wherein the processor is configured with processor-executable instructions to perform operations further comprising notifying the originator application that the shared media could not be sent to the target device in response to determining that no application ID in the first list of application IDs associated with the target device ID has at least one equivalence class in common with the originator application ID.

75. The server of claim 74, wherein the processor is configured with processor-executable instructions to perform operations further comprising:
 determining whether an application ID in the first list of application IDs associated with the target device ID matches the originator application ID; and
 selecting an application associated with the application ID in the first list in response to determining that the application ID in the first list matches the originator application ID.

76. The server of claim 74, wherein the processor is configured with processor-executable instructions to perform operations further comprising:
 determining whether the selected recipient application is actively registered to the target device; and
 selecting a new recipient application when the selected recipient application is not actively registered to the target device, wherein the new recipient application is an application associated with an application ID in the first list of application IDs associated with the target device ID that shares a next highest number of equivalence classes with the originator application ID.

77. A server, comprising:
 a processor configured with processor-executable instructions to perform operations comprising:
  registering each of an originator application and at least one application operating respectively on each of a plurality of target devices;
  associating each registering application with one or more equivalence classes, wherein each registering application is one of the originator application and the at least one application operating respectively on each of the plurality of target devices;
  receiving from the originator application a request to share media with each of the plurality of target devices;
  selecting an recipient application operating on each of the plurality of target devices, wherein the recipient application is one of the at least one application operating respectively on each of the plurality of target devices; and
  sending shared media to the recipient application operating on each of the plurality of target devices.

78. The server of claim 77, wherein the processor is configured with processor-executable instructions to perform operations such that registering comprises associating a registering application's application identifier (ID) with the registering application's device ID.

79. The server of claim 77, wherein the processor is configured with processor-executable instructions to perform operations such that associating each registering application with the one or more equivalence classes comprises:
 determining a registering application's classifiable characteristics;
 matching each classifiable characteristic to at least one equivalence class; and
 associating the registering application's application ID with each matching equivalence class.

80. The server of claim 79, wherein the processor is configured with processor-executable instructions to perform operations such that an equivalence class is defined by at least one of the registering application's characteristics, functionalities, and capabilities.

81. The server of claim 79, wherein the processor is configured with processor-executable instructions to perform operations such that determining the registering application's classifiable characteristics comprises receiving metadata from the registering application regarding the registering application's classifiable characteristics.

82. The server of claim 79, wherein the processor is configured with processor-executable instructions to perform operations such that determining the registering application's classifiable characteristics comprises receiving information regarding the registering application's classifiable characteristics as part of an application onboarding process.

83. The server of claim 79, wherein the processor is configured with processor-executable instructions to perform operations further comprising:
 creating a new equivalence class for an unmatched classifiable characteristic; and
 matching the unmatched classifiable characteristic with the new equivalence class.

84. The server of claim 77, wherein the processor is configured with processor-executable instructions to perform operations such that the request to share the media with each of the plurality of target devices comprises:
 a plurality of target device IDs associated with the plurality of target devices, wherein each target device ID is associated with only one target device;
 an originator application ID associated with the originator application; and
 the shared media.

85. The server of claim 84, wherein the processor is configured with processor-executable instructions to perform operations such that selecting the recipient application operating on each of the plurality of target devices comprises:
 determining a number of the plurality of target device IDs that share an association with a particular application ID;
 selecting a target device ID, wherein the selected target device ID is one of the plurality of target device IDs;
 selecting an application ID associated with the selected target device ID, wherein the selected application ID is associated with the most target devices in the plurality of target devices; and
 selecting the recipient application, wherein the recipient application is an application associated with the selected application ID.

86. The server of claim 85, wherein the processor is configured with processor-executable instructions to perform operations further comprising selecting a next target device ID, wherein the next target device ID is one of the plurality of target device IDs that has not previously been selected.

87. The server of claim 85, wherein the processor is configured with processor-executable instructions to perform operations further comprising:

determining whether the selected recipient application is actively registered to a target device associated with the selected target device ID; and selecting a new recipient application when the selected recipient application is not actively registered to the target device.

88. The server of claim 85, wherein the processor is configured with processor-executable instructions to perform operations further comprising:

determining whether the selected application ID shares at least one equivalence class with the originator application ID; and sending the shared media to the recipient application associated with the selected application ID in response to determining that the selected application ID shares at least one equivalence class with the originator application ID.

89. The server of claim 88, wherein the processor is configured with processor-executable instructions to perform operations further comprising selecting a next application ID associated with the selected target device ID in response to determining that the selected application ID shares no equivalence classes with the originator application, wherein the next application ID is an application ID associated with the selected target device ID that is associated with a next highest number of target device IDs in the plurality of target device IDs.

90. The server of claim 89, wherein the processor is configured with processor-executable instructions to perform operations further comprising notifying the originator application that the shared media could not be sent to a target device associated with the selected target device ID in response to determining that no application ID associated with the selected target device ID shares an equivalence class with the originator application ID.

91. The server of claim 77, wherein the processor is configured with processor-executable instructions to perform operations further comprising:

obtaining a list of application IDs associated with the recipient applications selected on the plurality of target devices, wherein each application ID of the list is associated with only one recipient application;

determining a number of times each application ID associated with one of the plurality of target devices is represented in the list;

determining a most frequently represented application ID;

selecting one of the plurality of target devices;

determining an application ID associated with the selected target device's recipient application;

determining whether the application ID associated with the selected target device's recipient application matches the most frequently represented application ID;

promoting the target device's recipient application in response to determining there is a match between the application ID associated with the selected target device's recipient application and the most frequently represented application ID; and recommending an application associated with the most frequently represented application ID when the application ID associated with the selected target device's recipient application does not match the most frequently represented application ID.

92. The server of claim 91, wherein the processor is configured with processor-executable instructions to perform operations further comprising sending the selected target device a report of applications selected as recipient applications on each of the plurality of target devices.

93. The server of claim 91, wherein the processor is configured with processor-executable instructions to perform operations such that promoting the target device's recipient application comprises sending a recommendation to the selected target device to download the application associated with the most frequently represented application ID.

94. The server of claim 93, wherein the processor is configured with processor-executable instructions to perform operations such that promoting the target device's recipient application comprises:

receiving a notification of acceptance of the recommendation; and sending the application associated with the most frequently represented application ID to the selected target device for download.

95. The server of claim 91, wherein the processor is configured with processor-executable instructions to perform operations such that promoting the target device's recipient application comprises sending a promotion of the selected target device's recipient application to target devices in the plurality of target devices that do not have the selected target device's recipient application.

96. The server of claim 95, wherein the processor is configured with processor-executable instructions to perform operations such that promoting the target device's recipient application comprises:

sending a message to the selected target device to prompt a user of the target device to promote the selected target device's recipient application; and receiving the promotion of the selected target device's recipient application.

97. A non-transitory server-readable storage medium having stored thereon server-executable software instructions configured to cause a server to perform operations comprising:

registering each of an originator application and at least one application operating on a target device;

associating each registering application with one or more equivalence classes, wherein each registering application is one of the originator application and the at least one application operating on the target device;

receiving from the originator application a request to share media with the target device;

selecting a recipient application operating on the target device, wherein the recipient application is one of the at least one application operating on the target device; and sending shared media to the recipient application operating on the target device.

98. The non-transitory server-readable storage medium of claim 97, wherein the stored server-executable software instructions are configured to cause the server to perform operations such that registering comprises associating a registering application's application identifier (ID) with the registering application's device ID.

99. The non-transitory server-readable storage medium of claim 97, wherein the stored server-executable software instructions are configured to cause the server to perform operations such that associating each registering application with the one or more equivalence classes comprises:

determining a registering application's classifiable characteristics;

matching each classifiable characteristic to at least one equivalence class; and associating the registering application's application ID with each matching equivalence class.

100. The non-transitory server-readable storage medium of claim 99, wherein the stored server-executable software instructions are configured to cause the server to perform operations such that an equivalence class is defined by at least one of the registering application's characteristics, functionalities, and capabilities.

101. The non-transitory server-readable storage medium of claim 99, wherein the stored server-executable software instructions are configured to cause the server to perform operations such that determining the registering application's classifiable characteristics comprises receiving metadata from the registering application regarding the registering application's classifiable characteristics.

102. The non-transitory server-readable storage medium of claim 99, wherein the stored server-executable software instructions are configured to cause the server to perform operations such that determining the registering application's classifiable characteristics comprises receiving information regarding the registering application's classifiable characteristics as part of an application onboarding process.

103. The non-transitory server-readable storage medium of claim 99, wherein the stored server-executable software instructions are configured to cause the server to perform operations further comprising:
   creating a new equivalence class for an unmatched classifiable characteristic; and
   matching the unmatched classifiable characteristic with the new equivalence class.

104. The non-transitory server-readable storage medium of claim 97, wherein the stored server-executable software instructions are configured to cause the server to perform operations such that the request to share media with the target device comprises:
   a target device ID associated with the target device;
   an originator application ID associated with the originator application; and
   the shared media.

105. The non-transitory server-readable storage medium of claim 104, wherein the stored server-executable software instructions are configured to cause the server to perform operations such that selecting the recipient application operating on the target device comprises:
   obtaining a first list of application IDs associated with the target device ID;
   obtaining a second list of equivalence classes of each application ID in the first list of application IDs associated with the target device ID;
   determining for each application ID in the first list of application IDs associated with the target device ID a number of equivalence classes that the originator application ID and each respective application ID in the first list of application IDs associated with the target device ID have in common; and
   selecting the recipient application, wherein the recipient application is an application associated with a particular application ID in the first list of application IDs associated with the target device ID that has a highest number of equivalence classes in common with the originator application ID.

106. The non-transitory server-readable storage medium of claim 105, wherein the stored server-executable software instructions are configured to cause the server to perform operations further comprising notifying the originator application that the shared media could not be sent to the target device in response to determining that no application ID in the first list of application IDs associated with the target device ID has at least one equivalence class in common with the originator application ID.

107. The non-transitory server-readable storage medium of claim 106, wherein the stored server-executable software instructions are configured to cause the server to perform operations further comprising:
   determining whether an application ID in the first list of application IDs associated with the target device ID matches the originator application ID; and
   selecting an application associated with the application ID in the first list in response to determining that the application ID in the first list matches the originator application ID.

108. The non-transitory server-readable storage medium of claim 106, wherein the stored server-executable software instructions are configured to cause the server to perform operations further comprising:
   determining whether the selected recipient application is actively registered to the target device; and
   selecting a new recipient application when the selected recipient application is not actively registered to the target device, wherein the new recipient application is an application associated with an application ID in the first list of application IDs associated with the target device ID that shares a next highest number of equivalence classes with the originator application ID.

109. A non-transitory server-readable storage medium having stored thereon server-executable software instructions configured to cause a server to perform operations comprising:
   registering each of an originator application and at least one application operating respectively on each of a plurality of target devices;
   associating each registering application with one or more equivalence classes, wherein each registering application is one of the originator application and the at least one application operating respectively on each of the plurality of target devices;
   receiving from the originator application a request to share media with each of the plurality of target devices;
   selecting a recipient application operating on each of the plurality of target devices, wherein the recipient application is one of the at least one application operating respectively on each of the plurality of target devices; and
   sending shared media to the recipient application operating on each of the plurality of target devices.

110. The non-transitory server-readable storage medium of claim 109, wherein the stored server-executable software instructions are configured to cause the server to perform operations such that registering comprises associating a registering application's application identifier (ID) with the registering application's device ID.

111. The non-transitory server-readable storage medium of claim 109, wherein the stored server-executable software instructions are configured to cause the server to perform operations such that associating each registering application with the one or more equivalence classes comprises:
   determining a registering application's classifiable characteristics;
   matching each classifiable characteristic to at least one equivalence class; and
   associating the registering application's application ID with each matching equivalence class.

112. The non-transitory server-readable storage medium of claim 111, wherein the stored server-executable software instructions are configured to cause the server to perform operations such that an equivalence class is defined by at least one of the registering application's characteristics, functionalities, and capabilities.

113. The non-transitory server-readable storage medium of claim 111, wherein the stored server-executable software instructions are configured to cause the server to perform operations such that determining the registering application's classifiable characteristics comprises receiving metadata from the registering application regarding the registering application's classifiable characteristics.

114. The non-transitory server-readable storage medium of claim 111, wherein the stored server-executable software instructions are configured to cause the server to perform operations such that determining the registering application's classifiable characteristics comprises receiving information regarding the registering application's classifiable characteristics as part of an application onboarding process.

115. The non-transitory server-readable storage medium of claim 111, wherein the stored server-executable software instructions are configured to cause the server to perform operations further comprising:
creating a new equivalence class for an unmatched classifiable characteristic; and
matching the unmatched classifiable characteristic with the new equivalence class.

116. The non-transitory server-readable storage medium of claim 109, wherein the stored server-executable software instructions are configured to cause the server to perform operations such that the request to share media with each of the plurality of target devices comprises:
a plurality of target device IDs associated with the plurality of target devices, wherein each target device ID is associated with only one target device;
an originator application ID associated with the originator application; and
the shared media.

117. The non-transitory server-readable storage medium of claim 116, wherein the stored server-executable software instructions are configured to cause the server to perform operations such that selecting the recipient application operating on each of the plurality of target devices comprises:
determining a number of the plurality of target device IDs that share an association with a particular application ID;
selecting a target device ID, wherein the selected target device ID is one of the plurality of target device IDs;
selecting an application ID associated with the selected target device ID, wherein the selected application ID is associated with the most target devices in the plurality of target devices; and
selecting the recipient application, wherein the recipient application is an application associated with the selected application ID.

118. The non-transitory server-readable storage medium of claim 117, wherein the stored server-executable software instructions are configured to cause the server to perform operations further comprising selecting a next target device ID, wherein the next target device ID is one of the plurality of target device IDs that has not previously been selected.

119. The non-transitory server-readable storage medium of claim 117, wherein the stored server-executable software instructions are configured to cause the server to perform operations further comprising:
determining whether the selected recipient application is actively registered to a target device associated with the selected target device ID; and
selecting a new recipient application when the selected recipient application is not actively registered to the target device.

120. The non-transitory server-readable storage medium of claim 117, wherein the stored server-executable software instructions are configured to cause the server to perform operations further comprising:
determining whether the selected application ID shares at least one equivalence class with the originator application ID; and
sending the shared media to the recipient application associated with the selected application ID in response to determining that the selected application ID shares at least one equivalence class with the originator application ID.

121. The non-transitory server-readable storage medium of claim 120, wherein the stored server-executable software instructions are configured to cause the server to perform operations further comprising selecting a next application ID associated with the selected target device ID in response to determining that the selected application ID shares no equivalence classes with the originator application, wherein the next application ID is an application ID associated with the selected target device ID that is associated with a next highest number of target device IDs in the plurality of target device IDs.

122. The non-transitory server-readable storage medium of claim 121, wherein the stored server-executable software instructions are configured to cause the server to perform operations further comprising notifying the originator application that the shared media could not be sent to a target device associated with the selected device target ID in response to determining that no application ID associated with the selected target device ID shares an equivalence class with the originator application ID.

123. The non-transitory server-readable storage medium of claim 109, wherein the stored server-executable software instructions are configured to cause the server to perform operations further comprising:
obtaining a list of application IDs associated with the recipient applications selected on the plurality of target devices, wherein each application ID of the list is associated with only one recipient application;
determining a number of times each application ID associated with one of the plurality of target devices is represented in the list;
determining a most frequently represented application ID;
selecting one of the plurality of target devices;
determining an application ID associated with the selected target device's recipient application;
determining whether the application ID associated with the selected target device's recipient application matches the most frequently represented application ID;
promoting the target device's recipient application in response to determining there is a match between the application ID associated with the selected target device's recipient application and the most frequently represented application ID; and
recommending an application associated with the most frequently represented application ID when the application ID associated with the selected target device's recipient application does not match the most frequently represented application ID.

124. The non-transitory server-readable storage medium of claim 123, wherein the stored server-executable software instructions are configured to cause the server to perform operations further comprising sending the selected target device a report of applications selected as recipient applications on each of the plurality of target devices.

125. The non-transitory server-readable storage medium of claim 123, wherein the stored server-executable software instructions are configured to cause the server to perform operations such that promoting the target device's recipient application comprises sending a recommendation to the selected target device to download the application associated with the most frequently represented application ID.

126. The non-transitory server-readable storage medium of claim 125, wherein the stored server-executable software instructions are configured to cause the server to perform operations such that promoting the target device's recipient application further comprises:
  receiving a notification of acceptance of the recommendation; and
  sending the application associated with the most frequently represented application ID to the selected target device for download.

127. The non-transitory server-readable storage medium of claim 123, wherein the stored server-executable software instructions are configured to cause the server to perform operations such that promoting the target device's recipient application comprises sending a promotion of the selected target device's recipient application to target devices in the plurality of target devices that do not have the selected target device's recipient application.

128. The non-transitory server-readable storage medium of claim 127, wherein the stored server-executable software instructions are configured to cause the server to perform operations such that promoting the target device's recipient application comprises:
  sending a message to the selected target device to prompt a user of the target device to promote the selected target device's recipient application; and
  receiving the promotion of the selected target device's recipient application.

* * * * *